United States Patent
Cheng et al.

(10) Patent No.: US 6,845,295 B2
(45) Date of Patent: Jan. 18, 2005

(54) METHOD OF CONTROLLING A ROBOT THROUGH A SINGULARITY

(75) Inventors: Sai-Kai Cheng, Rochester Hills, MI (US); Di Xiao, Rochester Hills, MI (US); Chi-Keng Tsai, Bloomfield Hills, MI (US); H. Dean McGee, Rochester Hills, MI (US); Min-Ren Jean, Rochester Hills, MI (US)

(73) Assignee: FANUC Robotics America, Inc., Rochester Hills, MI (US)

(*) Notice: Subject to any disclaimer, the term of this patent is extended or adjusted under 35 U.S.C. 154(b) by 153 days.

(21) Appl. No.: 10/382,387

(22) Filed: Mar. 6, 2003

(65) Prior Publication Data

US 2003/0171847 A1 Sep. 11, 2003

Related U.S. Application Data

(60) Provisional application No. 60/362,353, filed on Mar. 7, 2002.

(51) Int. Cl.[7] .............................................. G06F 19/00
(52) U.S. Cl. ..................... 700/245; 700/246; 700/247; 700/248; 700/249; 700/250; 700/251; 700/252; 700/253; 700/254; 700/255; 700/256; 700/257; 700/258; 700/259; 318/568.11; 318/568.12; 318/568.13; 318/568.14; 318/568.15; 318/568.16; 318/568.17; 219/121.61; 219/121.62; 219/121.63; 219/121.64; 219/125.11; 219/125.12; 901/2; 901/8; 901/9; 901/16; 901/23
(58) Field of Search ................................. 701/1, 11, 21, 701/23; 901/2, 8, 9, 16, 23, 32; 414/729; 700/245–264; 318/568.1, 568.11, 568.12, 568.13, 568.14, 568.15, 568.16; 219/121.61, 121.62, 121.63, 121.64, 125.11, 125.12

(56) References Cited

U.S. PATENT DOCUMENTS

| 4,680,519 A | 7/1987 | Chand et al. |
| 4,716,350 A | 12/1987 | Huang et al. |

(List continued on next page.)

OTHER PUBLICATIONS

A Three–Point Velocity Approach To Robot Motion Control by Keith L. Doty, Department of Electrical Engineering, University of Florida, Gainesville, Florida, and by James D. English III, Department of Electrical Engineering, Purdue University, West Lafayette, Indiana; Syroco, Capri, Italy, Sep. 19–21, 1994.

(List continued on next page.)

*Primary Examiner*—Thomas G. Black
*Assistant Examiner*—McDieunel Marc
(74) *Attorney, Agent, or Firm*—Howard & Howard

(57) ABSTRACT

A method of controlling a robot (32) includes the steps of selecting an initial configuration from at least one of a first, second, and third sets to position a TCP at a starting point (44) along a path (33) and selecting a final configuration different than the initial configuration to position the TCP at an ending point (46). Next, the TCP moves from the starting point (44) while maintaining the initial configuration, approaches the singularity between a first point (48) and a second point (50), and selects one of the axes in response to reaching the first point (48). The angle for the selected axis is interpolated from the first point (48) to the second point (50). After the interpolation, the angles about the remaining axes are determined and positions the arms in the final configuration when the TCP reaches the second point (50) and moves to the ending point (46) while maintaining the final configuration.

36 Claims, 11 Drawing Sheets

U.S. PATENT DOCUMENTS

| | | | |
|---|---|---|---|
| 4,893,254 A | | 1/1990 | Chan et al. |
| 4,967,126 A | | 10/1990 | Gretz et al. |
| 5,038,089 A | | 8/1991 | Szakaly |
| 5,129,045 A | | 7/1992 | Stelzer et al. |
| 5,157,315 A | | 10/1992 | Miyake et al. |
| 5,293,461 A | | 3/1994 | Grudic et al. |
| 5,297,238 A | | 3/1994 | Wang et al. |
| 5,341,289 A | | 8/1994 | Lee |
| 5,575,597 A | * | 11/1996 | Bailey et al. ............... 409/201 |
| 5,581,166 A | * | 12/1996 | Eismann et al. ....... 318/568.22 |
| 5,590,034 A | | 12/1996 | Snell |
| 6,321,137 B1 | | 11/2001 | De Smet |
| 6,332,372 B1 | | 12/2001 | Takenaka et al. |
| 6,519,860 B1 | * | 2/2003 | Bieg et al. .................... 33/503 |
| 6,584,378 B1 | * | 6/2003 | Anfindsen .................. 700/245 |
| 6,668,466 B1 | * | 12/2003 | Bieg et al. .................... 33/503 |
| 2003/0093129 A1 | * | 5/2003 | Nicolelis et al. .............. 607/45 |
| 2004/0093119 A1 | * | 5/2004 | Gunnarsson et al. ........ 700/245 |
| 2004/0158356 A1 | * | 8/2004 | Webb et al. ................ 700/250 |

OTHER PUBLICATIONS

Singularity Consistent Inverse Kinematics By Enhancing The Jacobian Transpose by G. Schreiber and G. Hirzinger, published in ARK 1998, Strobl/Wolfgangsee Advances in Robot Kinematics : Analysis and Control J. Lenar i and Manfred L. Husty, Kluwer Academic Publishers, Dordrecht pp. 209–216.

Path Trajectory Verification for Robert Manipulators in a Manufacturing Environment; by Abdel–Malek, K. and Yeh, H.J. (1997), IMechE Journal of Engineering Manufacture, vol. 211, part B, pp. 547–556.

Position Analysis and Singularity Identification of A Industrial Robot by H.—Y. Lee and W. Wälischmiller uncovered Jan. 2002.

Introduction to Robotics Mechanics and Control by John J. Craig uncovered Jan. 2002, www.bridgeport.edu/~sobh/html/proj/sanjeev/project.html.

Singularities; prepared by Rick Shepherd, dated Mar. 1997, uncovered Jan. 2002, www.et.byu.edu/~ered/robotics/singular/singular.html.

* cited by examiner

METHOD OF CONTROLLING A ROBOT THROUGH A SINGULARITY

RELATED APPLICATIONS

This patent application claims priority to and all advantages of U.S. Provisional Patent Application No. 60/362,353, which was filed on Mar. 7, 2002.

BACKGROUND OF THE INVENTION

1. Field of the Invention

The subject invention relates to a method for controlling a robot such that a tool attached to the robot may follow a Cartesian path without excessive joint speed while encountering a singularity.

2. Description of the Related Art

An industrial robot can be viewed as a chain of stiff links, or arms. Referring to FIGS. 2A, 3, and 6, a robot is shown having varying numbers of axes. FIG. 2A show a robot 20 having a base 22, a first arm 23 connected to the base 22 and rotatable about a first axis A1, and a second arm 24 connected to the first arm 23 and being rotatable about a second axis A2, a third link 25 connected to the second arm and being rotatable about a third axis A3. This robot 20 is commonly referred to as a three-axis robot. The robot 20 in FIGS. 3 and 6 has the base 22, the first arm or link 23 connected to the base 22 that is rotatable about a first axis A1, the second arm or link 24 connected to the first arm 23 that is rotatable about a second axis A2, the third arm or link 25 connected to the second arm 24 that is rotatable about a third axis A3, a fourth arm or link 26 connected to the third arm 25 rotatable about a fourth axis A4, a fifth arm or link 27 connected to the fourth arm 26 rotatable about a fifth axis A5, a sixth arm or link 28 connected to the fifth arm 27 rotatable about a sixth axis A6 and a tool 29 solidly attached to the sixth arm 28.

In general, two links are joined to each other such that they are rotatable in relation to each other around a rotary axis. Each rotary axis is provided with a position transducer which measures the angle of rotation $\theta_i$, where "i" stands for the axis number. The configuration of the robot is described by the angles of rotation of the axes. Normally, an industrial robot has five or six rotary axes, but may have as few as three axes, as described above. The final link in the chain includes the tool which, depending on the field of application, may be, a gripper, a glue gun, a sprayer, spot welding equipment, and the like. The position of the tool is defined by a tool center point (TCP). The axes of the robot may also be referred to as joints between the links.

Motion of the robot is created by providing a drive signal to a motor coupled to the joint to effect movement of the robot about the axis of rotation. Many applications require the control of the tool on specific trajectories in Cartesian space. One of the most common trajectories of the tool is a path in a straight line. This path is indicated as 30 in FIGS. 2A, 3, and 6. In order to move the robot tool along the path 30, the line is divided into a large number of positions and the robot joint angles are calculated at each position which specifies the location and orientation requirement on the path. Thus, by commanding the joint positions of the robot at a large number of points on the straight line, the desired motion of the robot tool is generated.

Presently, there are two methods of implementing a desired motion: a programmed motion method or a continuous controlled motion method from a teach pendant, i.e., a linear jog method, in which the destination position is continuously updated "on the fly" or in real-time to control the trajectory. In the programmed motion method, the trajectory of the tool is specified within the program. In the continuous controlled motion (jogging) method, the trajectory is generated in real-time.

The process of transforming a position in Cartesian space to joint angles is commonly called the inverse kinematics. The converse is the forward kinematics which, given a set of joint angles, defines a unique tool position. The forward and inverse kinematics are the key transformations in processing robot motions through computer control.

The inverse kinematics for the robot is not usually unique. For a given location and orientation of the tool in Cartesian space, there is more than one way of configuring the robot arms to place the tool at the desired position. The forward kinematics is always unique, since for a given set of joint angles, the tool can only be at one location and orientation in space.

A common articulated robot geometry has six degrees of freedom. The joint angles starting from the base of the robot are commonly termed the base rotation A1, shoulder rotation A2, elbow rotation A3, wrist roll A4, wrist pitch A5, and wrist yaw A6. The complexity of determining the six joint angles of the six degrees of freedom for a given location component and orientation component directly depends on the robot geometry. Some robot geometries yield a closed form inverse kinematics. In a closed form inverse kinematics, the joint angles are calculated by solving simultaneous equations, which do not require iterations or checks for convergence. Alternatively, some robot geometries do not yield a closed form solution, and iterative methods are generally employed to solve the inverse kinematics by iterating until the solution converges. In either case, when a singular configuration is encountered, the inverse kinematics solution typically degenerates into an infinite number of joint solutions. Consequently, when controlling a robot along a Cartesian path that passes through a singularity, a finite Cartesian speed typically demands an infinite joint speed. This is a longstanding issue in robotics, that is, when the robot approaches a singularity, considerable reconfigurations of certain joint axes are required and these axes also attain very high axis speeds. These reconfigurations may cause the robot to deteriorate over time. Also, any supply lines (electrical, paint, etc.) connected to the tool may tangle or even break as the reconfigurations occur.

For the robot to be able to follow a rectilinear path which passes through a singular point, two problems have to be solved. For one thing, the robot must detect that it approaches a singularity and it must be guided through the singularity such that the rectilinear path is followed. For the reasons described above, the passage through the singularity must not entail the considerable reconfigurations of the axes.

One method of detecting that the robot approaches a singularity, and of passing through the singularity without unnecessary reconfigurations of certain of the robot axes is illustrated in U.S. Pat. No. 5,590,034. The method comprises factorizing the Jacobian matrix of the robot, which is converting the matrix into a product of several factors, wherein each of the factors may be inverted in a simple manner. The Jacobian matrix is factorized in such a way that one of the factors becomes a diagonal matrix. A diagonal matrix is inverted by inverting the diagonal elements. If any of the diagonal elements is smaller than a preset value, this is an indication that the robot is approaching a singularity. On the basis of the diagonal elements which are smaller than this value, it is determined which axes run the risk of attaining high axis velocities and these axes are locked. When the axes are locked this means that the robot movement can only take place in certain directions. A major disadvantage of this solution is that the robot cannot follow a given path through the singularity since the tool does not retain its position through the singularity. Furthermore, the method requires processors with large capacity to factor the matrices and has to deal with numerical stability of the algorithm involved.

U.S. Pat. No. 4,680,519 discloses another method of passing through singularity along a Cartesian path without unnecessary major reconfigurations of certain robot axes. The main object of this patent is to present an iterative method of solving the inverse kinematics of robots with offset wrist where closed form solution does not exist. However, this iterative method breaks down at or near robot singularities. Hence as a side objective, this patent present a different method of solving the inverse kinematics when the robot is at/near singularity, which requires that the wrist joint angles joint angles 4, 5 and 6) be given along with the Cartesian location as input. In moving through the singularity region, for each interpolation point, it needs to know the wrist joint angles and the Cartesian location. The resultant smooth robot motion is achieved in the expense of giving up the Cartesian orientation control along the path as it moves through the singularity region. Furthermore, this patent addresses only the wrist singularity and does not address other singularities.

One common approach to identify the singularities of a given robot structure, is to compute its Jacobian matrix as described below. The conditions that cause the determinant of this Jacobian matrix to be zero are the singularity conditions for this robot.

The Jacobian matrix relates the joint speed to the Cartesian speed of the robot $$\begin{bmatrix} v \\ \omega \end{bmatrix} = J\dot{\theta}$$

Hence for a given Cartesian path with a certain program Cartesian speeds, its joint speeds are given by $$\dot{\theta} = J^{-1}\begin{bmatrix} v \\ \omega \end{bmatrix}$$

So when the determinant of the Jacobian matrix is equal to 0, i.e. det(J)=0, the inverse of J does not exists and a singularity is reached. At such conditions, the joint speed for certain axes are infinite.

For purpose of describing the most common types of singularities encountered in industrial robots, let us consider a 6 axes robot with an inline wrist, as shown in FIG. 1., where the wrist axes (aces 4, 5 and 6) intersect at point called the wrist center point (WCP). For the purpose of exposing the singularity conditions of this robot, the Jacobian matrix of this robot for relating frame 6 velocities to the joint speeds, expressed in frame 3 coordinate frame, can be derived as.

$$^3J = \begin{bmatrix} 0 & l_{12} & l_{13} & 0 & 0 & 0 \\ l_{21} & 0 & 0 & 0 & 0 & 0 \\ 0 & l_{32} & l_{33} & 0 & 0 & 0 \\ -s_3 & 0 & 0 & 1 & 0 & c_5 \\ 0 & 0 & 1 & 0 & c_4 & s_4 s_5 \\ c_3 & 0 & 0 & 0 & s_4 & -c_4 s_5 \end{bmatrix}$$

where $l_{21}=d_1+d_2 s_2+d_{31} c_3+d_{32} s_3$ $l_{12}32\ d_2 c_2 c_3+d_2 s_2 s_3$ $l_{32}32\ d_2 c_2 s_3-d_2 s_2 c_3$ $l_{13}=c_3(-d_{31} s_3+d_{32} c_3)+s_3(d_{31} c_3+d_{32} s_3)$ $l_{33}=s_3(-d_{31} s_3+d_{32} c_3)-c_3(d_{31} c_3+d_{32} s_3)$ Denoting $$^3J = \begin{bmatrix} A & 0 \\ B & C \end{bmatrix}$$

det(J)=det($^3$J)=det(A)·det(C) and det(A)=$l_{21}(l_{13}l_{32}-l_{12}l_{33})$ det(C)=$-s_5$ where det( ) indicates the determinant of a matrix Note that J is singular when the determinant of matrix A is equal to zero and the determinant of matrix C is equal to zero. All together, there are three distinct conditions in which J is singular giving rise to three distinct singularities. A first type of singularity occurs in the wrist when det(C)=0, that is when sin($\theta_5$)=0, where the fourth axis A4 and the sixth axis A6 are aligned, as shown in FIGS. 6 and 7. This is by far the most common type of singularity encountered in the industry. This is commonly referred to as a wrist singularity. A second type of singularity occurs when the distance of a wrist center point (WCP) from the first axis A1 is zero, that is when $l_{21}$=0, causing det(A) to be 0. In other words, when the WCP is on the line passing through the first axis A1. This type of singularity occurs only when the first axis A1, the second axis A2, and the third axis A3 have sufficient motion ranges, as shown in FIGS. 3 and 4. This is commonly referred to as an overhead singularity. A third type of singularity occurs when the second axis A2 and the third axis A3, are inline, that is when ($l_{13}l_{32}-l_{12}l_{33}$)=0, causing det(A) to be 0. This type of singularity occurs when the angle between the link axes is 180 degrees, then the second axis A2 and the third axis A3 are fully stretched out, or when the angle between the link axes is zero degree, as shown in FIGS. 2A and 2B. This is commonly referred to as an inline singularity.

For a given Cartesian location and orientation, there are in general eight possible sets of joint angles to reach the position. These correspond to three possible independent configuration sets: a first configuration set having an up configuration and a down configuration, which are related to the second axis A2 and the third axis A3, a second configuration set having a flip configuration and a no-flip configuration, which are related to the wrist axes A4, A5, A6 and a third configuration set having a front configuration and a back configuration, which are related to the sign of the distance of WCP to the first axis A1. A boundary condition of each configuration set represents one type of singularity for the robot. This is another way of identifying the robot singularities besides using the Jacobian matrix, as described above. To put it another way, the singularity occurs when the arms are in a position where the configuration cannot be determined. Hence the up/down configuration set is associated with the inline singularity, the flip/no-flip configuration set is associated with the wrist singularity and finally the front/back configuration set is associated with the overhead singularity.

For robots with an inline wrist, flip/no-flip configurations involve only the wrist axes A4, A5, A6. That is, angles of rotation ($\theta_1,\theta_2,\theta_3$) about axis A1, A2, and A3 remains the same. If the flip configuration solution for the wrist axes is ($\theta_4,\theta_5,\theta_6$), then the no-flip solution is given by ($\theta_4 \pm 180, -\theta_5, \theta_6 \mp 180$), and vice versa.

Hence the flip/no-flip configuration can be identified by the sign of $\theta_5$. When $\theta_5$ is positive, it is in the flip configuration. When $\theta_5$ is negative, it is in the no-flip configuration.

At the boundary point of flip and no-flip configuration, i.e. $\theta_5=0$, this is the singularity condition. This is by far the most common singularity. It is present in all five and six axes robots and for both inline and offset wrist.

Consider a straight line path that passes through wrist singularity, i.e., with $\theta_5=0$ which is the boundary between flip and no-flip configurations, as shown in FIG. 6. As shown in FIG. 7, by maintaining the same "no-flip" configuration along this path, axis A4 has to move 180 degrees in one direction and axis A6 has to move 180 degrees in the opposite direction in one interpolation period just before and after the singular point. Therefore, the fourth axis A4 and sixth axis A6 has to maintain speeds of 18,000 deg/sec (for 10 msec interpolation time) in one interpolation period. Hence, the TCP will have to slowdown, because both axes A4 and A6 are limited by their respective joint speed limits as the robot moves through the singular point. Referring to FIG. 8, the TCP speed slow down is graphically represented. The TCP speed was traveling at a slow speed of 500 mm/s before and after the singularity and drops to less than 100 mm/s during the period where the fourth axis A4 and the sixth axis A6 are limiting to their respective joint speed limits when the robot passes through the wrist singularity.

For a given Cartesian location and orientation, there are two solutions corresponding to the robot's up/down configuration. With reference to FIG. 2C, a line from the start of the second link to the wrist center point (WCP), there are two ways to position the wrist center point (WCP) to reach the desired location. In the up configuration, the elbow is above the line, whereas in the down configuration, the elbow is below the line. Note that the up/down configuration is when the second link and the third link moves in a vertical plane and is referred to as a left/right configuration when these links moves in a horizontal plane as depicted in FIGS. 2A and 2B.

Without loss of generality, the effect of this Inline singularity can be explained with reference to FIGS. 2A and 2B for the horizontal case. The singularity occurs in this type of robot when the first link and the second link are inline, i.e. fully stretched out or fully folded in. Referring to FIG. 2A, if the path passes through the exact singularity, i.e. the boundary point between "right" and "left where the configuration is indeterminable. While moving along this path 30, the first link has to move 180 degrees as it moves through the singular point in order to remain at "right" configuration for the rest of the motion. For an interpolation time of 10 msec, this corresponds to requiring the first link to move at a very high speed of 18,000 deg/sec. By limiting the first link to its joint speed limit, it takes a longer amount of time to pass through this short distance across the singular point, thus slowing down the robot's TCP speed.

Similarly, for a given Cartesian location and orientation there are two solutions corresponding to the robot's front/back configuration. Referring to FIGS. 3 and 4, this involves mainly the first link and indirectly the second link and the third link. If a coordinate frame were attached to the first link, as shown in FIG. 4, the distance of the WCP in the positive x direction is in the front configuration. For the same WCP location, the back configuration is obtained by moving $\theta_1$ 180 degrees from its current position, and bending $\theta_2,\theta_3$, backwards to reach the same WCP location.

The boundary of front and back configuration is when the distance of WCP to the first axis A1 is zero. At this point, the sign of the distance is neither positive nor negative, which results in a singularity. The first link has to move 180 degrees in one interpolation period, which means a first link joint speed of 18,000 deg/sec (for 10 msec interpolation period). Again TCP speed will be slowed to limit the first link's joint speed within its limit, as is shown in FIG. 5. The TCP speed before and after the singularity is 500 mm/s, but slows to about 100 mm/s due to this joint speed limit.

Accordingly, the related art methods are characterized by one or more inadequacies as described above. Specifically, the related art methods are unable to maintain the TCP speed through the singularity and are unable to maintain the TCP on the path through all the common types of singularities. The related art methods also do not suggest minimizing any errors between the location and orientation components while moving along the path that passes through or near the singularity. Furthermore, none of the related art methods change configuration of the robot arms to move through the singularity.

SUMMARY OF THE INVENTION AND ADVANTAGES

The subject invention provides a method of controlling a robot. The robot has a plurality of arms rotatable about a plurality of axes that define a plurality of angles therebetween. The robot also supports a tool having a tool center point (TCP) for relative movement of the tool along a path. The path has a starting point and an ending point that are defined in Cartesian coordinates.

The robot has at least one of a first, a second, and a third configuration sets. The first configuration set has an up configuration and a down configuration, the second configuration set having a flip configuration and a no-flip configuration, and the third configuration set having a front configuration and a back configuration. The robot approaches a singularity associated with the configuration set along the path while moving about the plurality of axes. The singularity occurs between a first point and a second point.

The method includes the steps of selecting the configuration of at least one of the first, second, and third sets to position the TCP at the starting point with the angles of the arms in an initial configuration. The method of the subject invention includes the step of selecting the other configuration of at least one of the sets to position the TCP at the ending point with the angles of the arms in a final configuration. To move the TCP from the starting position along the path while maintaining the initial configuration, the arms are rotated about the axes by changing the angles between the axes. The robot approaches the singularity which occurs between a first point and a second point along the path and selects one of the axes in the initial configuration in response to reaching the first point. The angle of the selected axis is then interpolated from the first point to the second point in a predetermined number of steps between the first point and the second point. The angles about the remaining axes are determined in relationship to the aforesaid interpolation at each of the steps to position the arms in the final configuration when the TCP reaches the second point. To move the TCP along the path to the ending point while maintaining the final configuration, the arms are rotated about the axes by changing the angles therebetween.

Accordingly, the subject invention overcomes the inadequacies of the related art systems. Specifically, the subject invention controls the robot to move through and near a singularity region without slowing TCP speed down because there are no excessive motions about the joints. Furthermore, the location component and the orientation component of the Cartesian path are optimized, which improves path accuracy of the TCP. The method is computationally efficient with numerical stability and convergence. The method is adaptable to avoid all three types of singularities common to almost all industrial robots: wrist singularity, overhead singularity and inline singularity. The method works for both inline wrist robots, with closed form inverse kinematics solution, and offset wrist robots, without closed form inverse kinematics solution. The method can also be applied to all common types of industrial robots with different number of joint axes, such four, five, and six axes and different combination of rotary and sliding axes. The method works equally well for the path that encounters an exact singularity or near a singularity.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, a method of controlling a robot 32 is disclosed. The robot 32 has a plurality of arms that are rotatable about a plurality of axes defining a plurality of angles therebetween. The axes may also be referred to herein as joint axes.

Figure 9:
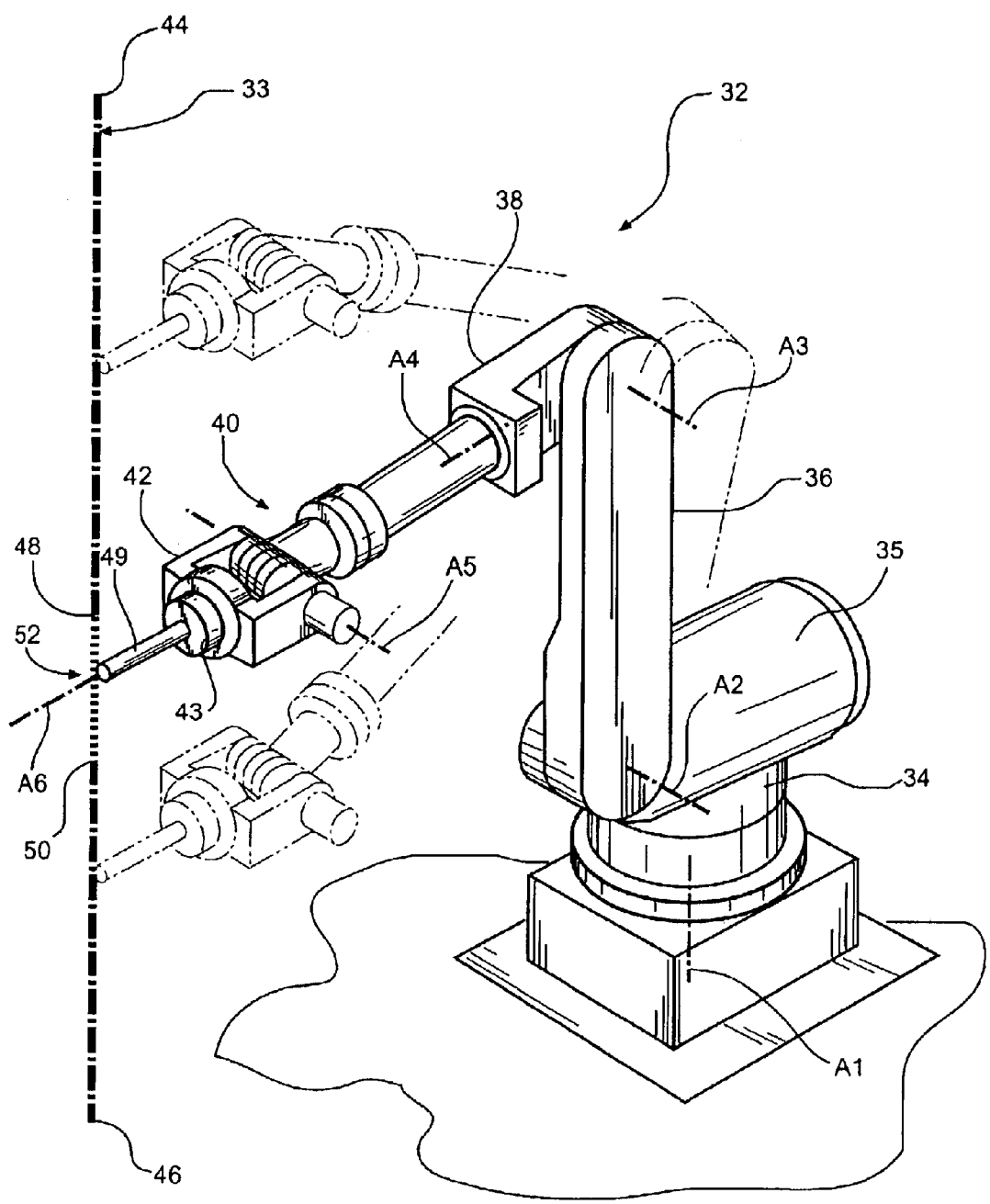
FIG. 9 is a perspective view of a six axis robot performing the method of the subject invention by changing configuration in response to encountering the wrist singularity.

The robot 32 supports a tool 49 having a tool center point (TCP) for relative movement of the tool 49 along a path 33. One example of a robot 32 for carrying out the subject invention is illustrated in FIG. 9. The robot 32, shown in FIG. 9, has six arms or links altogether, it has a base 34, a first arm or link 35 connected to the base 34 that is rotatable about a first axis A1, a second arm or link 36 connected to the first arm 35 that is rotatable about a second axis A2, a third arm or link 38 connected to the second arm 36 that is rotatable about a third axis A3, a fourth arm or link 40 connected to the third arm 38 rotatable about a fourth axis A4, a fifth arm or link 42 connected to the fourth arm 40 rotatable about a fifth axis A5, a sixth arm or link 43 connected to the fifth arm 42 rotatable about a sixth axis A6 and a tool 49 solidly attached to the sixth arm 43. For ease of description, the robot 32 is described below in terms of the 6-axis robot, even thought the subject invention is equally applicable to other robots.

The path 33 has a starting point 44 and an ending point 46 defined in Cartesian coordinates. Path planning is carried out to determine a set of interpolation points along the path 33. The set of interpolation points includes a desired Cartesian location component and a desired orientation component. The robot 32 has at least one of a first, a second, and a third configuration sets. The first configuration set has an up configuration and a down configuration, the second configuration set has a flip configuration and a no-flip configuration, and the third configuration set has a front configuration and a back configuration, as described above. The robot 32 approaches a singularity associated with the configuration set along the path 33 while moving about the plurality of axes. For descriptive purposes, the singularity occurs between a first point 48 and a second point 50 along the path 33. As understood by those skilled in the art, there are three types of singularities, a wrist singularity, an overhead singularity, and an inline singularity.

The method of controlling the robot 32 includes the steps of selecting the configuration of at least one of the first, second, and third sets to position the TCP at the starting point 44 with the angles of the arms in an initial configuration. The other configuration of at least one of the sets is also selected. This positions the TCP at the ending point 46 with the angles of the arms in a final configuration.

Generally, normal inverse kinematics is used to control the robot 32 from point 44 to point 48 with this initial configuration. Between point 48 and point 50, that is around singularity region 52, the method includes the step of commanding the robot 32 to pass through exact singularity, thereby changing the configuration related to the singularity to the other configuration in the set, resulting in the final configuration. This is always possible since each type of singularity occurs at the boundary of its corresponding configuration set. The preferred embodiment of this method of passing through the singularity with configuration change between point 48 and point 50 also includes the steps of selecting one of the joint axes related to the singularity, computing its joint angle at point 48 with the initial configuration using normal inverse kinematics, computing its joint angle at point 50 with the final configuration using normal inverse kinematics, and interpolating this joint axis from its starting joint angle at point 48 to its ending joint angle at point 50 in a predetermined number of steps. Furthermore at each interpolation step, the method further includes the step of solving the remaining joint angles such that the resultant Cartesian location and Cartesian orientation matches the desired Cartesian location and the Cartesian orientation as close as possible. After reaching the second point 50 at the final configuration, normal inverse kinematics is once again used to control the robot 32 to move to the ending point 46 with this final configuration. All of the steps generally described above are described, where necessary, in greater detail hereinbelow.

To provide examples associated with selecting the initial and final configurations, the user may selected the up configuration, the no-flip configuration, and the front configuration to define the initial configuration and subject method selects the up configuration, the flip configuration, and the front configuration to define the final configuration to overcome the wrist singularity. For different applications, especially where the robot is mounted to a ceiling, instead of a floor, the user may select the up configuration, the no-flip configuration, and the front configuration to define the initial configuration and the subject method selects the up configuration, the no-flip configuration, and the back configuration to define the final configuration to overcome the overhead singularity. Yet for another application, the user may select the up configuration, the no-flip configuration, and the front configuration to define an initial configuration and the subject method selects the down configuration, the no-flip configuration, and the front configuration to define the final configuration to overcome the inline singularity. It is to be understood that by selecting the configuration, while being described as selected by a user for ease of understanding, a computer, a controller, or the like may select the configuration of the robot.

The arms are rotated about the axes by changing the angles therebetween to move the TCP from the starting point 44 along the path 33 while maintaining the initial configuration. In response to reaching the first point 48, one of the axes in the initial configuration is selected and the angle for the selected axis is interpolated from the first point 48 to the second point 50. More specifically, the angle is interpolated in a predetermined number of steps 52 between the first point 48 and the second point 50. After the interpolation, the angles about the remaining axes are determined at each of the steps 52. By determining the angles at each of the steps 52, the arms are positioned in the final configuration when the TCP reaches the second point 50. After reaching the second point 50, the arms are rotated about the axes by changing the angles therebetween to move the TCP along the path 33 to the ending point 46 while the final configuration is maintained.

The initial configuration of the arm at the starting point 44 is normally specified by the user by selecting the configuration of at least one of the first, second and third configuration sets. For example, the user may select the up configuration, the no-flip configuration and the front configuration to define the initial configuration. The arms are rotated about the axes by changing the angles therebetween to move the TCP from the starting point 44 along the path 33 while maintaining the initial configuration up to the first point 48. Depending on the type of singularity encountered in the region 52 from the first point 48 to the second point 50, this invention selects the other configuration in the configuration set that is associated with that particular type of singularity.

Continuing with the examples introduced above, when wrist singularity is encountered, the initial configuration at point 48 (up, no-flip, front), will be changed to (up, flip, front) at point 50, because the no-flip/flip configuration set is associated with the wrist singularity. When the overhead singularity is encountered, the initial configuration at point 48 (up, no-flip, front), will be changed to (up, no-flip, back) at point 50, because the front/back configuration set is associated with the overhead singularity. When the inline singularity is encountered, the initial configuration at point 48 (up, no-flip, front), will be changed to (down, no-flip, front) at point 50, because the up/down configuration set is associated with the inline singularity. This final configuration at point 50 will be maintained in moving the TCP from point 50 to the ending point 46 along the path 33. This change in configuration from point 48 to point 50 is achieved by selecting one (or more) of the joint axes associated with the particular type of singularity, and the joint angle for the selected joint axis is interpolated from the first point 48 to the second point 50. More specifically, this joint angle is interpolated in a predetermined number of steps 52 between the fist point 48 and the second point 50. After each joint interpolation, the joint angles of the remaining joint axes are determined at each of the steps 52. By determining the angles at each of the steps 52, the arms are positioned in the final configuration when the TCP reaches the second point 50.

At each of the points along the path 33, such as at the starting point 44, the ending point 46, the first point 48, the second point 50, and each of the steps 52, the points are further defined by the desired location component and the desired orientation component. In region 52, as the angles are determined about the remaining axes, an actual, or resultant, location component and an actual orientation component are determined. In other words, by interpolating one of the angles, the actual location component and the actual orientation component may not exactly match the desired components.

In region 52, because the actual location component and the actual orientation component may be different than the desired components, the method further includes the step of minimizing a difference between at least one of the actual location component and the desired location component and the actual orientation component and the desired orientation component. The step of minimizing the difference is based upon the type of robot applications.

For certain types of robots 32 having certain structures, the step of minimizing the difference between the location and orientation components is further defined as equating the actual location component to the desired location component and minimizing the difference between the actual orientation component and the desired orientation component. For example, in paint applications and welding applications, it is important to maintain the location component. The applications are not significantly effected by the actual orientation component being different than the desired orientation component.

In order to minimize the difference between the orientation components, an orientation equation is selected that is a function of at least two of the angles. The orientation equation is solved by manipulating the angles until the orientation equation results in a minimum value. It is preferable that the minimum value is zero, however, depending upon the configuration and type of robot 32, the minimum value may be near zero and may be specified by the user. It is to be understood that different orientation equations are selected based upon the number of axes for the robot 32 and the type of singularity encountered in the selected configurations.

For ease of illustrating the tradeoffs in minimizing location error and minimizing orientation error, we consider the following specific cases related to different type of singularities and where appropriate a six axes robot is used. It is to be understood that different tradeoffs may be utilized in minimizing location and orientation errors and for different number of robot axes, while still practicing the subject invention.

When wrist singularity is encountered, we illustrate a method of equating the actual location component to the desired location component and minimizing the difference between the actual orientation component and the desired orientation component. In order to minimize the difference between the orientation components, an orientation equation is selected that is a function of at least two of the wrist angles. The orientation equation is solved by manipulating the angles until the orientation equation results in a minimum value. It is preferable that the minimum value is zero. However, the actual value depends on how far the path 33 is away from wrist singularity. The minimum value is zero when the path 33 passes through exact wrist singularity, and increases as the path 33 is farther away from wrist singularity.

Once the orientation equation is selected, in order to solve for the minimum values, the orientation equation is iteratively solved to minimize the difference between the actual orientation component and the desired orientation component. It is preferable to only have to perform two iterations that result in the minimum value. However, depending upon the orientation equation selected and the number of angles involved, more iterations may be necessary to reach the minimum value.

The step of iteratively solving the orientation equation is further defined as determining the derivative of the orientation equation with respect to each of the at least two angles, preferably wrist angles, as will be described more below, and applying a Newton-Raphson method to the determined derivative. The iterations continue by selecting the angles that result in the derivative equaling zero. If zero is not obtainable, based upon the orientation equation or the number of axes of the robot 32, then the iterations are complete when the minimum value is obtained. This is always possible, hence the method always converges. The zero value of this derivative corresponds to the minimum value of the orientation equation.

Since the desired location component is known and because the path 33 is known and the wrist angles are determined, equating the actual location component to the desired location component is further defined as manipulating the angles, preferably the major axes, about the remaining axes to equate the actual location component to the desired location component. If one angle has been interpolated and two other angles are solved by the orientation equation, any of the remaining major joint axes angles may be manipulated so that the actual location component matches the desired location component.

Alternately, it may be preferable to equate the actual orientation component to the desired orientation component, while minimizing the difference between the actual location component and the desired location component. For different types of singularities that occur in the different configurations, it may be desirable to equate orientation components. An example of this situation arises where the robot 32 is being used to transport a part, and if the orientation were changed, the part would fall from the robot 32, such as a stack of material. However, the location component can vary for the path 33 without dropping the part.

In order to minimize the difference between the actual and desired location components, a location equation is selected that is a function of at least two of the angles. The location equation is solved by manipulating the at least two angles until the location equation results in a minimum value. It is preferable that the minimum value is zero, however, depending upon the configuration and type of robot 32, the minimum value may be greater than zero, as illustrated in the following sections. It is to be understood that different location equations are selected based upon the number of axes for the robot 32 and the type of singularity encountered in the configurations.

Because the desired orientation component is known and because the path 33 is known, equating the actual orientation component to the desired orientation component is further defined as manipulating the angles about the remaining axes to equate the actual orientation component to the desired orientation component. If one angle has been interpolated and two other angles are solved by the location equation, any of the remaining angles may be manipulated so that the actual orientation component matches the desired orientation component.

The subject invention provides another method of controlling the robot 32 as described above. This method is most applicable with six axis robots, which encounters the wrist singularity. The method includes the steps of selecting the up configuration, the no-flip configuration, and the front configuration from the first, second, and third sets to position the TCP at the starting point 44 with the angles of the arms in an initial configuration. Next, the final configuration is selected to be in the up configuration, the flip configuration, and the front configuration from the sets to position the TCP at the ending point 46. The arms are rotated about the axes by changing the angles therebetween to move the TCP from the starting point 44 along the path 33 while maintaining the initial configuration and approaching the singularity which occurs between a first point 48 and a second point 50 along the path 33.

In response to reaching the first point 48, one of the axes in the initial configuration is selected and the angle for the selected axis is interpolated from the first point 48 to the second point 50 in a predetermined number of steps 52 between the first point 48 and the second point 50. After the interpolation, the angles about the remaining axes are determined at each of the steps 52. By determining the angles at each of the steps 52, the arms are positioned in the final configuration when the TCP reaches the second point 50.

After reaching the second point 50, the arms are rotated about the axes by changing the angles therebetween to move the TCP along the path 33 to the ending point 46 while maintaining the final configuration. The subject invention provides yet another method of controlling the robot 32 described above. This method is most applicable to six axis robots mounted to either a floor or a ceiling, which encounters the overhead singularity. The method includes the steps of selecting the up configuration, the no-flip configuration, and the front configuration from the first, second, and third sets to position the TCP at the starting point 44 with the angles of the arms in an initial configuration. The final configuration is selected to be in the up configuration, the no-flip configuration, and the back configuration from the sets to position the TCP at the ending point 46. The arms are rotated about the axes by changing the angles therebetween to move the TCP from the starting point 44 along the path 33 while maintaining the initial configuration and approaching the singularity which occurs between a first point 48 and a second point 50 along the path 33.

In response to reaching the first point 48, one of the axes in the initial configuration is selected and the angle for the selected axis is interpolated from the first point 48 to the second point 50 in a predetermined number of steps 52 between the first point 48 and the second point 50. After the interpolation, the angles about the remaining axes are determined at each of the steps 52. By determining the angles at each of the steps 52, the arms are positioned in the final configuration when the TCP reaches the second point 50. After reaching the second point 50, the arms are rotated about the axes by changing the angles therebetween to move the TCP along the path 33 to the ending point 46 while maintaining the final configuration.

The subject invention provides still another method of controlling the robot 32 described above. The method includes the steps of selecting the configuration of at least one of the first, second, and third sets to position the TCP at the starting point 44 with the angles of the arms in an initial configuration, selecting the other configuration of at least one of the sets to position the TCP at the ending point 46 with the angles of the arms in a final configuration, and rotating the arms about the axes by changing the angles therebetween to move the TCP from the starting point 44 along the path 33 while maintaining the initial configuration. The robot 32 approaches the singularity, which occurs between a first point 48 and a second point 50 along the path 33.

The angles about the axes are determined to move the TCP between the first point 48 and the second point 50 and through the singularity, and the arms are rotated about the axes accordingly by changing the angles therebetween to move the TCP along the path 33 while maintaining the final configuration to the ending point 46. It is to be understood that different steps may be utilized to position the arms in the final configuration when moving between the first point 48 and the second point 50, while still practicing the subject invention. The remaining steps associated with this embodiment of the method have already been described above.

Figure 12:
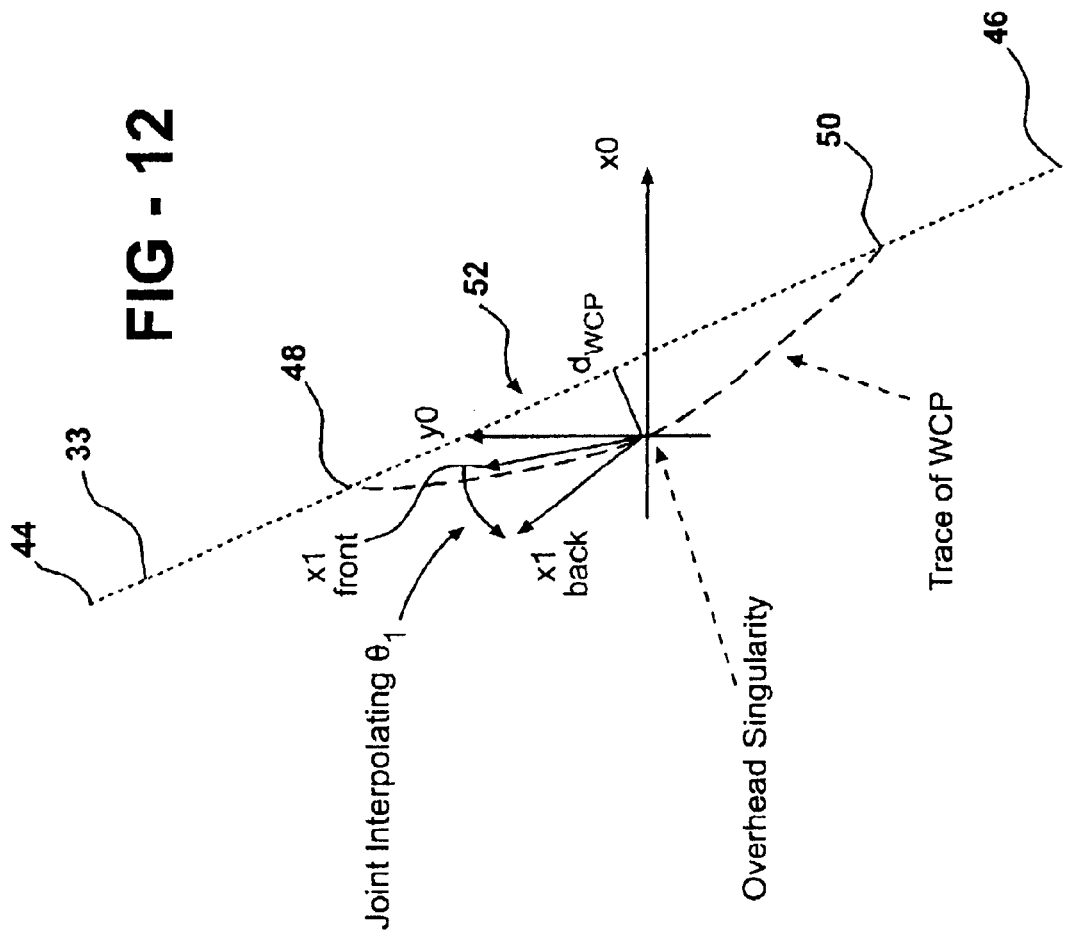
FIG. 12 is a top view of (i) a desired path near overhead singularity and (ii) a trace of the WCP performing the method of the subject invention which changes configuration by passing through the exact overhead singularity.

When overhead singularity is encountered, the method of equating the actual orientation component to the desired orientation component and minimizing the difference between the actual location component and the desired location component is utilized. Since joint axis 1 is involved in overhead singularity, it may be chosen as the selected axis to joint interpolate from point 48 to point 50, (to change the configuration from front to back using the example above). Hence at each interpolated point along 52, the joint value of axis 1 is known. Next, the other major axes, i.e. axes 2 and 3 are manipulated such that the wrist center point WCP, which is solely a function of axes 1, 2, and 3, is closest to the desired location. This can always be solved. As shown in FIG. 12, the trace of the WCP will pass through the exact overhead singularity. And the location error in region 52 is a function of how far the path 33 is from overhead singularity. The location error can be zero when the path passes through exact overhead singularity and increases as the path moves farther away. Once the WCP is determined, the wrist axes 4, 5 and 6 can be manipulated such that the actual orientation component matches the desired orientation component.

Figure 13:
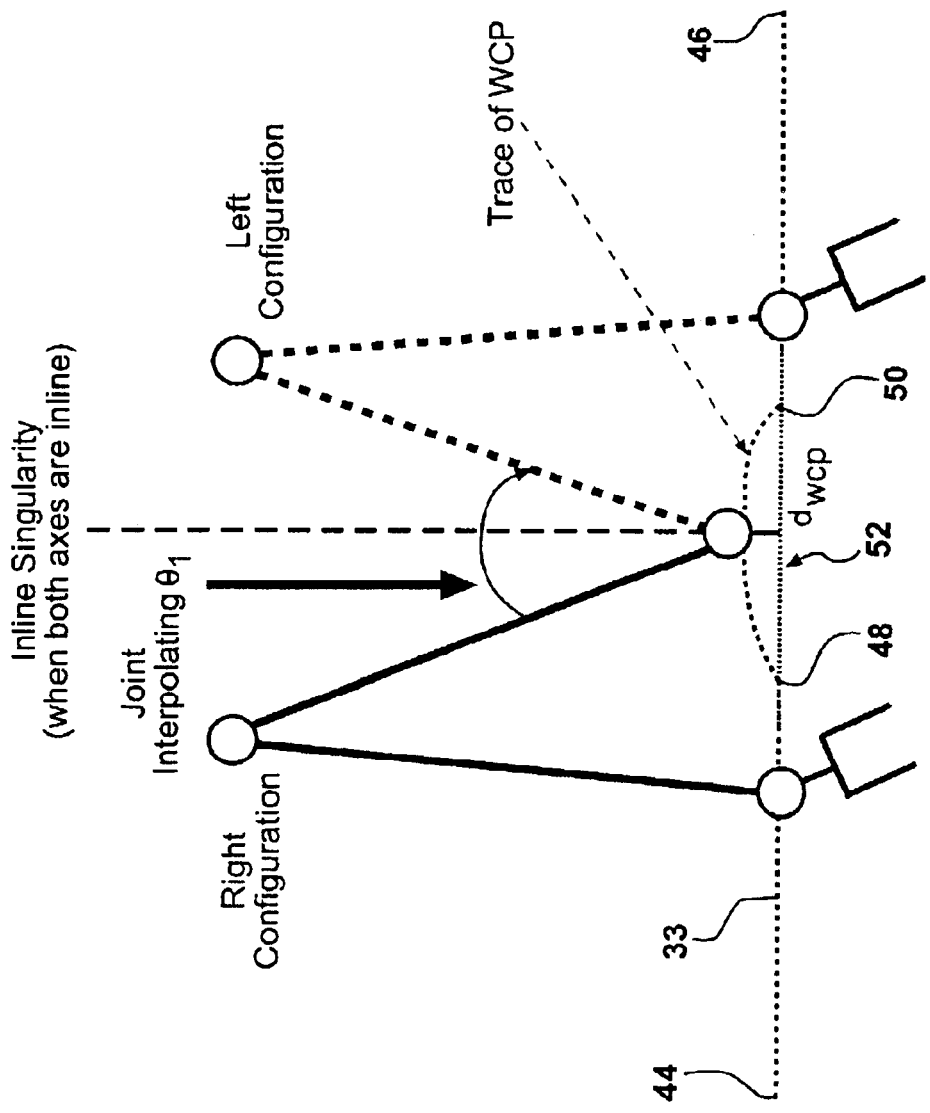
FIG. 13 is a top view of (i) a desired path near inline singularity and (ii) a trace of the WCP performing the method of the subject invention which changes configuration by passing through the exact inline singularity.

When inline singularity is encountered, we illustrate a method of equating the actual orientation component to the desired orientation component and minimizing the difference between the actual location component and the desired location component. Since joint axis 2 is involved in inline singularity, it may be chosen as the selected axis to joint interpolate from point 48 to point 50, (to change the configuration from up to down using the example above). Hence at each interpolated point along 52, the joint value of axis 2 is known. Next, the other major axes, i.e. axes 1 and 3 are manipulated such that the wrist center point WCP, which is solely a function of axes 1, 2, and 3, is closest to the desired location. This can always be solved. FIG. 13 shows the trace of the WCP, it passes through the exact inline singularity. And the location error in region 52 is a function of how far the path 33 is from inline singularity. The location error can be zero when the path passes through exact inline singularity and increases as the path moves farther away. Once the WCP is determined, the wrist axes 4, 5 and 6 can be manipulated such that the actual orientation component matches the desired orientation component.

Wrist Singularity Example

For the robot 32 having the first axis A1, the second axis A2, the third axis A3, the fourth axis A4, the fifth axis A5, and the sixth axis A6 respectively defining the first angle, the second angle, the third angle, the fourth angle, the fifth angle, and the sixth angle, an example according to the method is described below. The initial configuration can be any of eight possible configurations, hence without loss of generality, for the following description, assume the initial configuration is up, noflip, front. The wrist singularity is associated with the second configuration set of noflip and flip. At point 50, the step of selecting the other configuration in the set is then defined as selecting the flip configuration, resulting in the final configuration of up, flip, front at point 50. In the region 52, the step of selecting one of the axes is further defined as selecting the fourth axis A4. Normal inverse kinematics is used to solve for joint 4 with up, noflip, front configuration at point 48 and with up, flip, front configuration at point 50. The step of interpolating the angle of the selected axis is further defined as interpolating the fourth angle from its starting value at point 48 to its ending value at point 50. The step of minimizing the Cartesian orientation error while matching the Cartesian location within the region 52 with the fourth angle known is further illustrated as follows. p The desired orientation component is denoted by the 3×3 rotation matrix R. Let us further denote R as [n o a], where n is a normal vector, o is an orient vector, and a is an approach vector, as is known in the robotic arts. An orientation equation represents the error between the desired orientation and the actual orientation.

Different orientation equation and different weighting can be applied to each of these vectors based upon the robot 32. In the following, for ease of illustration, each vector is weighted the same and the angle between the approach vectors and the angle between the orient vectors are used. It is to be understood that one skilled in the art would select different vectors to solve for different singularity and for different types of robot 32.

$$f = (1.0 - \underline{a}_{desired} \cdot \underline{a}_{tcp}) + 1.0 - \underline{o}_{desired} \cdot \underline{o}_{tcp})$$

where

· indicates dot product $\underline{a}_{desired}, \underline{o}_{desired}$ are the desired approach and orient vectors respectively $\underline{a}_{tcp}, \underline{o}_{tcp}$ are the actual approach and orient vectors respectively The function f is a representation of the orient equation mentioned in the method. When there is an exact match between the desired orientation and the actual orientation, the value of f evaluates to zero. If zero is not obtainable, then f is greater than zero. Furthermore, it is preferable that f is a function of $\theta_5, \theta_6$.

The orientation equation, f, is smooth and continuous, and its first partial derivatives $$\frac{\partial f}{\partial \theta_5} \text{ and } \frac{\partial f}{\partial \theta_6}$$

continuously change from negative to zero to positive around its minimum point. Hence, applying the Newton-Raphson method on $$F = \begin{bmatrix} \frac{\partial f}{\partial \theta_5} \\ \frac{\partial f}{\partial \theta_6} \end{bmatrix}$$

and search $\theta_5, \theta_6$ for its zero values, which corresponds to minimum f, quadratic convergence can be achieved.

Note that each of the partial derivatives $$\frac{\partial f}{\partial \theta_5} \text{ and } \frac{\partial f}{\partial \theta_6}$$

are scalars and are given by $$\frac{\partial f}{\partial \theta_5} = -a_{desired} \cdot \frac{\partial}{\partial \theta_5}(a_{tcp}) - o_{desired} \cdot \frac{\partial}{\partial \theta_5}(o_{tcp})$$

$$\frac{\partial f}{\partial \theta_6} = -a_{desired} \cdot \frac{\partial}{\partial \theta_6}(a_{tcp}) - o_{desired} \cdot \frac{\partial}{\partial \theta_6}(o_{tcp})$$

For a given robot structure, the 3 by 1 vectors $$\frac{\partial}{\partial \theta_5}(a_{tcp}), \frac{\partial}{\partial \theta_6}(a_{tcp}), \frac{\partial}{\partial \theta_5}(o_{tcp}),$$

and $$\frac{\partial}{\partial \theta_6}(o_{tcp})$$

can be symbolically derived in a straightforward manner.

Newton-Raphson Formulation on F:
Find $\theta_5, \theta_6$ such that $$F = \begin{bmatrix} \frac{\partial f}{\partial \theta_5} \\ \frac{\partial f}{\partial \theta_6} \end{bmatrix}$$

is as close to $$\begin{bmatrix} 0 \\ 0 \end{bmatrix}$$

as possible
Starting from the initial $$\underline{\theta}_k = \begin{bmatrix} \theta_5 \\ \theta_6 \end{bmatrix}$$

compute the next $\underline{\theta}_{k+1}$ as
$\underline{\theta}_{k+1} = \underline{\theta}_k - J_e^{-1} F(\underline{\theta}_k)$
where $$J_e = \begin{bmatrix} \frac{\partial F}{\partial \theta_5} & \frac{\partial F}{\partial \theta_6} \end{bmatrix} = \begin{bmatrix} \frac{\partial^2 f}{\partial \theta_5^2} & \frac{\partial^2 f}{\partial \theta_6 \partial \theta_5} \\ \frac{\partial^2 f}{\partial \theta_5 \partial \theta_6} & \frac{\partial^2 f}{\partial \theta_6^2} \end{bmatrix}$$

Knowing the symbolic form of the first partial derivatives, it is straightforward to derive the second derivative in $J_e$. Therefore, $J_e$ is a 2×2 matrix, whose inverse can similarly be symbolically computed.

Since f is smooth, so is F, the method is numerically stable with quadratic convergence.

Figure 11:
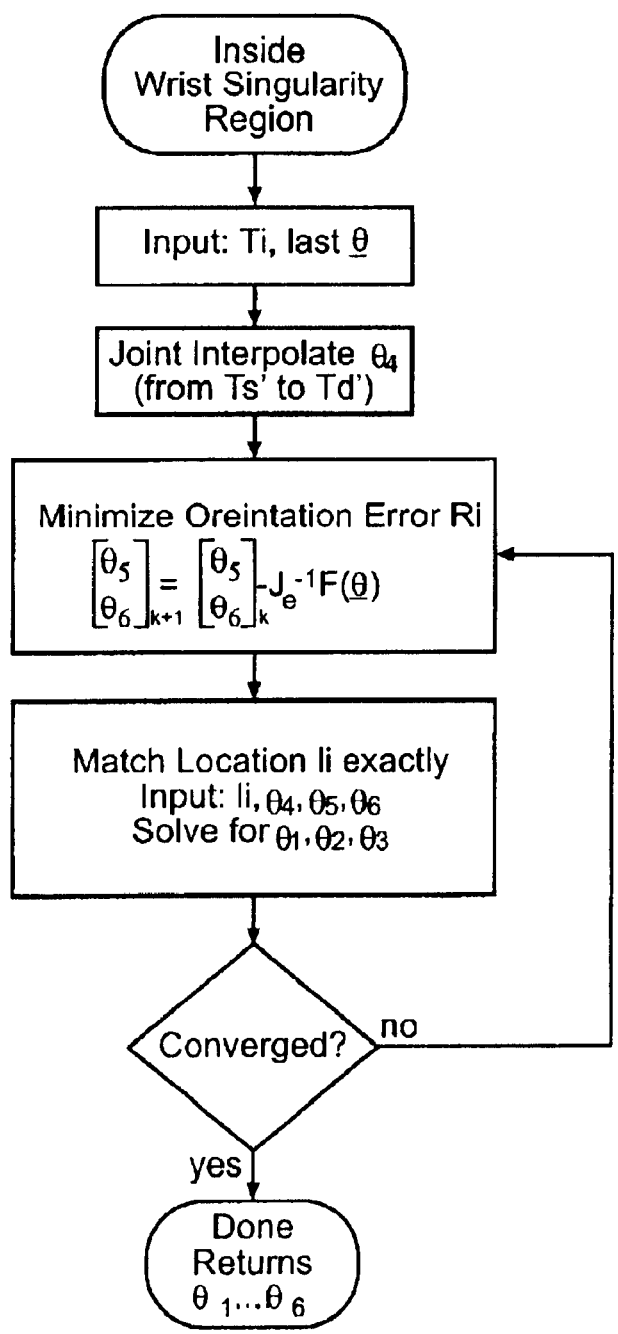
FIG. 11 is a flowchart of the subject invention.

Once $\theta_4, \theta_5, \theta_6$ are known, the step of equating the actual location component to the desired location component can be achieved as follows. Knowing the wrist angles $\theta_4, \theta_5, \theta_6$, the location of the WCP can be computed. Next, the major axes can be solved to match this WCP location, thereby matching the actual location component to the desired location component. Since the major axes will affect the actual orientation, if the orientation error is not acceptable, the above two steps can be repeated iteratively as summarized in the flowchart of FIG. 11. For a majority of cases, the above method converges in 2 iteration steps.

Figure 10:
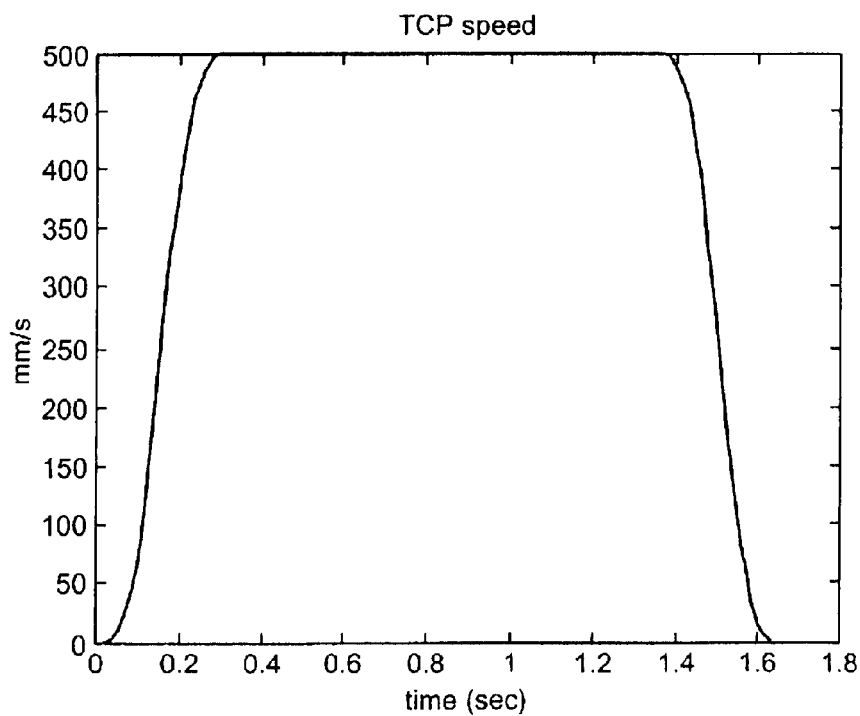
FIG. 10 is a graphical representation of the robot of FIG. 9 maintaining the TCP speed as the robot passes through the singularity.

Utilizing the method of the subject invention allows the TCP speed to be maintained while minimizing the location and orientation components. As shown in FIG. 10, the TCP speed remains constant at 500 mm/s as the robot 32 moves through the singularity.

The methods described above are applicable for robots 32 operating under program motion, where both the starting 44 and the ending points 46 are known. The method is equally applicable for robot 32 operating under jogging motion. For jogging motion, the ending point 46 is a short distance in the jogged direction from the current position. The same equations above can be used for the jogging motion. Basically, if the ending point 46 is between the first point 48 and the second point 50, the same procedure is used as that of interpolating the steps 52, wherein the ending point 46 is one of the steps 52. Hence, the difference in the fourth axis A4 from the first point 48 to the ending point 46 is known. Then, the fourth axis A4 is determined at the second point 50 to determine what the fourth axis A4 needs to be to change configuration. Hence, as the robot 32 is jogged through the singularity region, the wrist configuration of the robot 32 is changed and high axis speed about the fourth axis A4 and the sixth axis A6 is avoided.

Overhead Singularity Example

For the robot 32 having the first axis A1, the second axis A2, the third axis A3, the fourth axis A4, the fifth axis A5, and the sixth axis A6 respectively defining the first angle, the second angle, the third angle, the fourth angle, the fifth angle, and the sixth angle, an example according to the method is described below. Again, the initial configuration is immaterial. For this example, up, noflip, front is the initial configuration. The overhead singularity is associated with the third configuration set of front and back. At point 50, the step of selecting the other configuration in the set is then defined as selecting the back configuration, resulting in the final configuration up, noflip, back at point 50. In the region 52, the step of selecting one the axes is further defined as selecting the first axis A1. Normal inverse kinematics is used to solve for joint 1 with up, noflip, front configuration at point 48 and with up, noflip, back configuration at point 50. The step of interpolating the angle of the selected axis is further defined as interpolating the first angle from its starting value at point 48 to its ending value at point 50. The step of minimizing the Cartesian location error while matching the Cartesian orientation within the region 52 with the first angle known is illustrated as follows.

As the robot 32 moves along the path 33, the singularity is detected, by checking if the WCP is close to the first axis A1, i.e. the x- and y-components of the WCP in Cartesian space are both close to zero. By using a predefined tolerance, the singularity region can easily be characterized as a set of points that has a distance from the first axis A1 less than the tolerance.

In region 52, based on the interpolated joint 1 value and the desired Cartesian location component, we solved for joint 2 and joint 3 to position the WCP such that the location error is minimized. As shown in FIG. 12, this can be best described by considering the top view of the trace of WCP in region 52. At each step, with the interpolated joint 1 value defined, the WCP is constrained to move in a plane formed by link 2 and link 3. By projecting the desired location onto this plane, we can then solve for joint 2 and joint 3 with a small location error. Consequently, the WCP trace will pass through the exact overhead singularity following this procedure, and the maximum location error is the distance $d_{wcp}$ as shown in FIG. 12. Note that if the path 33 passes through exact overhead singularity, the location error is zero. Finally, knowing the first three joint angles, the remaining joint angles can be solved to maintain the exact orientation. The end result is that, the subject invention allows the TCP speed to be maintained in region 52 without high joint axis A1 speed while encountering overhead singularity.

Inline Singularity Example

Figure 1:
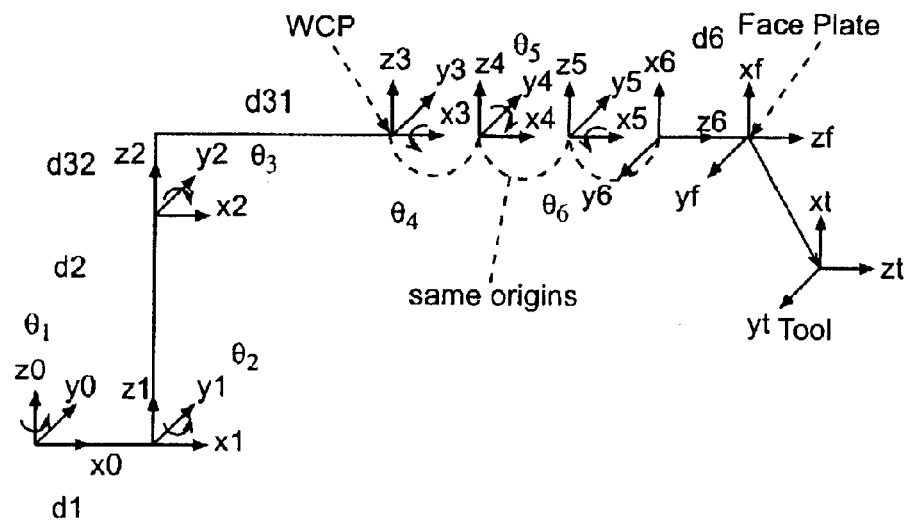
FIG. 1 is a graphical representation of a coordinate frame assignment for a six axes inline wrist robot.
Figure 4:
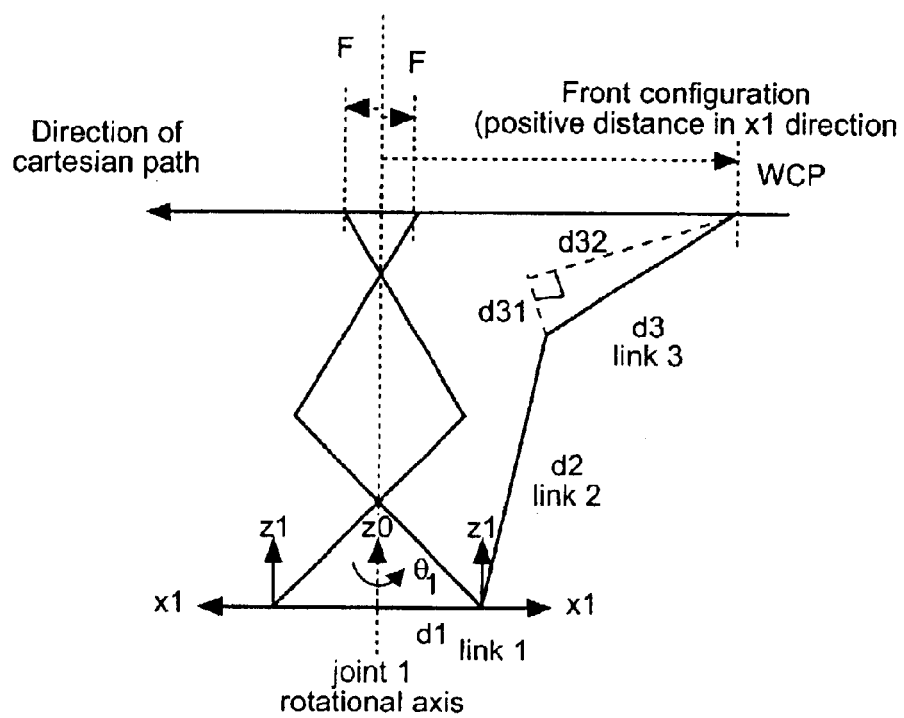
FIG. 4 is a prior art graphical representation of the robot of FIG. 3 maintaining configuration in response to encountering the overhead singularity.
Figure 2A:
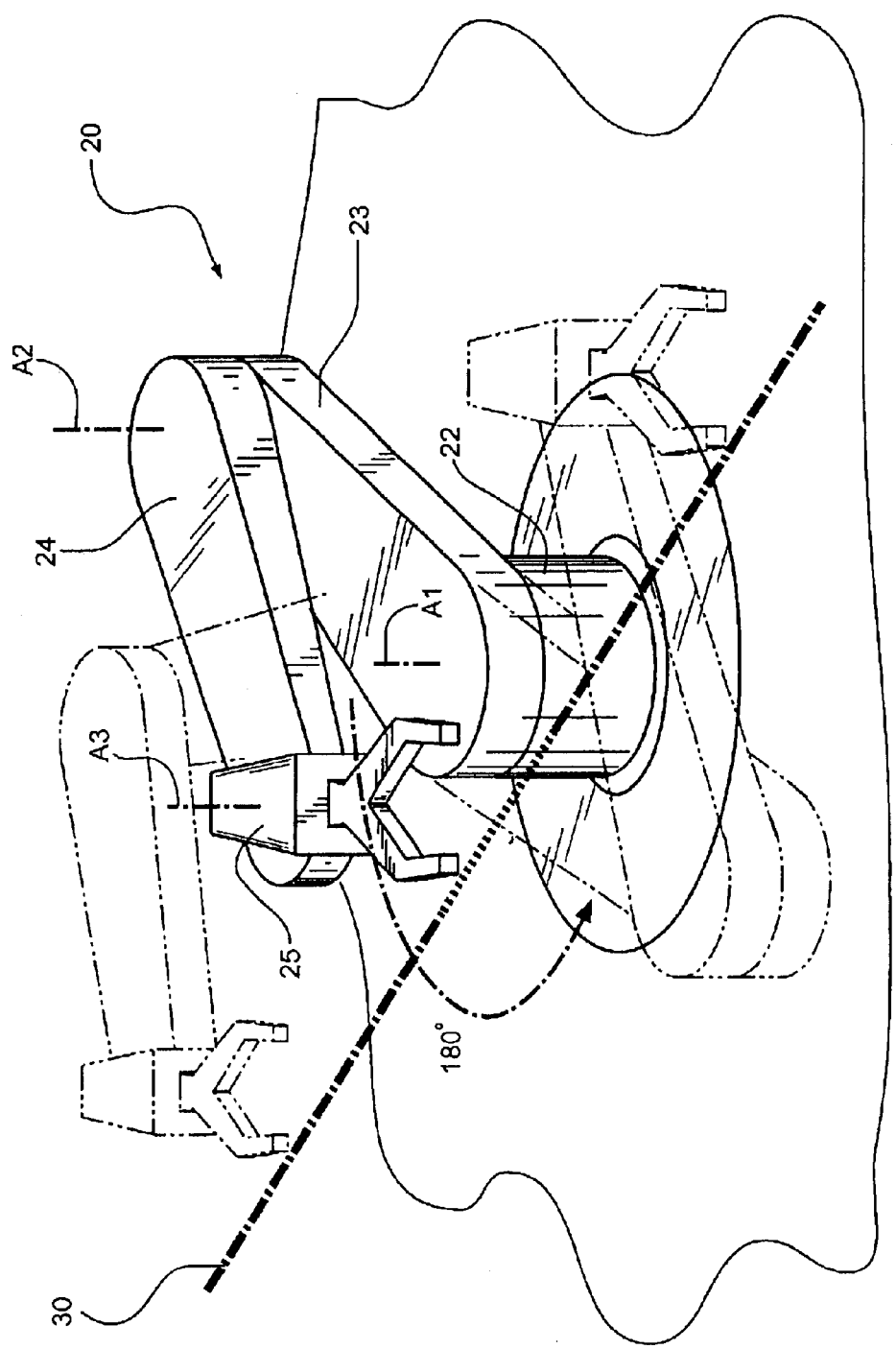
FIG. 2A is a prior art perspective view of a three axis robot moving along a path and rotating 180 degrees about a first axis in response to encountering an inline singularity.
Figure 2B:
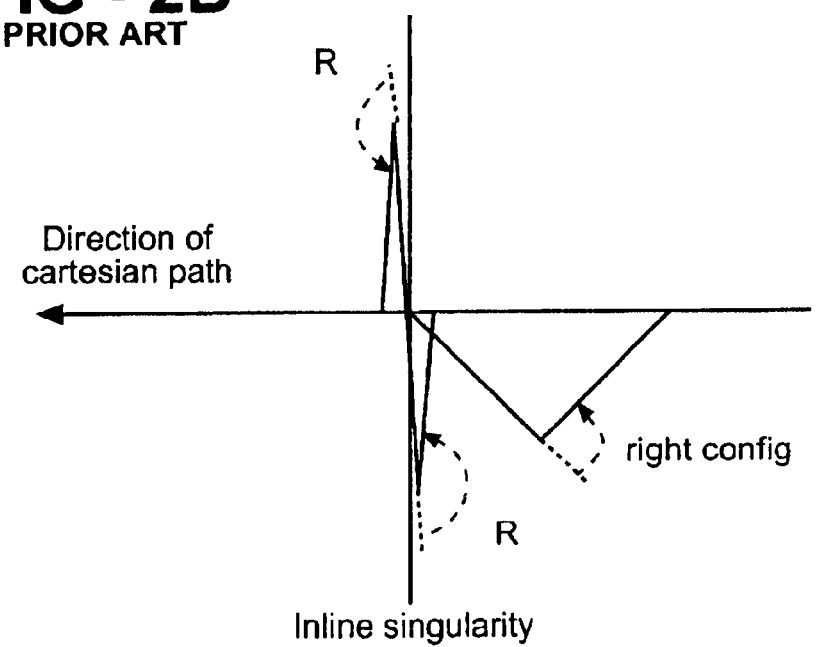
FIG. 2B is a prior art graphical representation of the robot of FIG. 2A maintaining configuration in response to encountering the inline singularity.
Figure 2C:
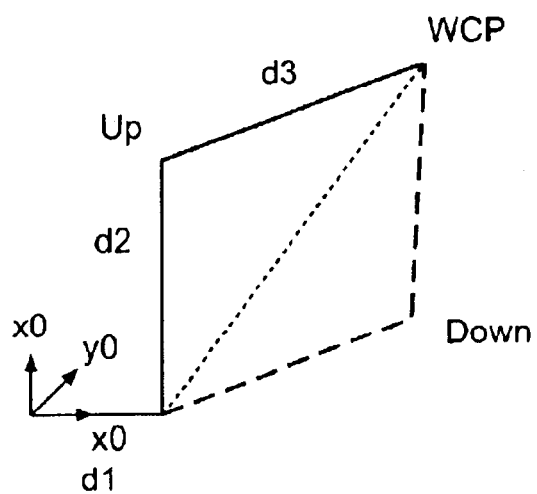
FIG. 2C is a prior art graphical representation of an up/down configuration.
Figure 3:
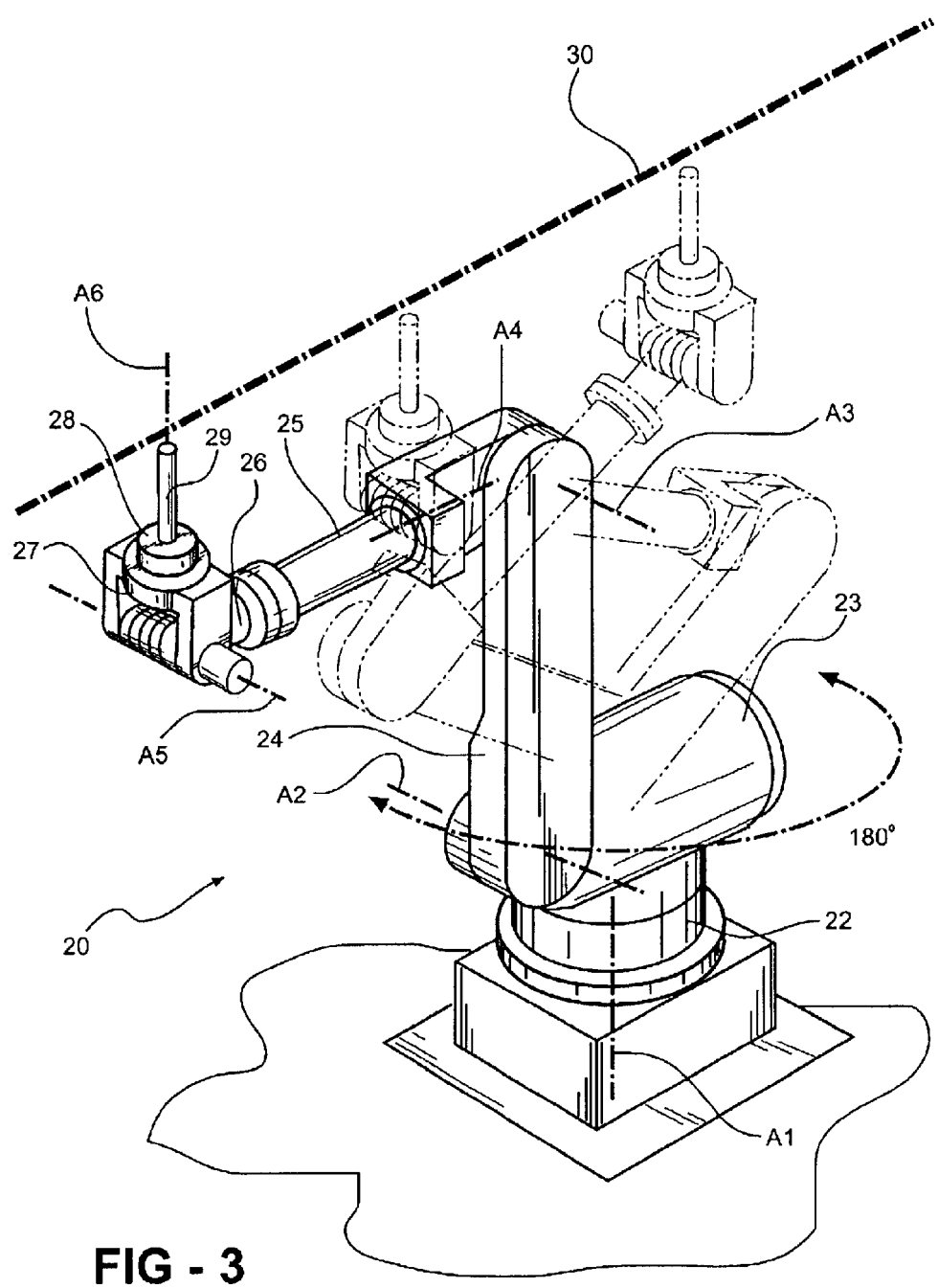
FIG. 3 is a prior art perspective view of six axis robot moving along a path and rotating 180 degrees about the first axis in response to encountering an overhead singularity.
Figure 5:
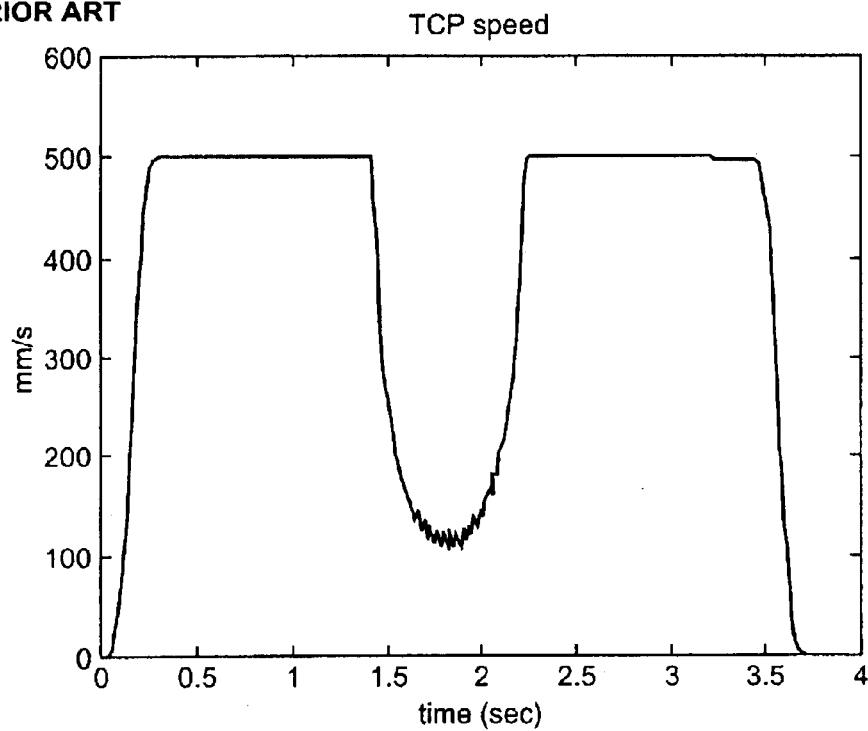
FIG. 5 is a prior art graphical representation of the robot of FIG. 3 slowing a tool center point (TCP) speed as the robot rotates about the first axis.
Figure 7:
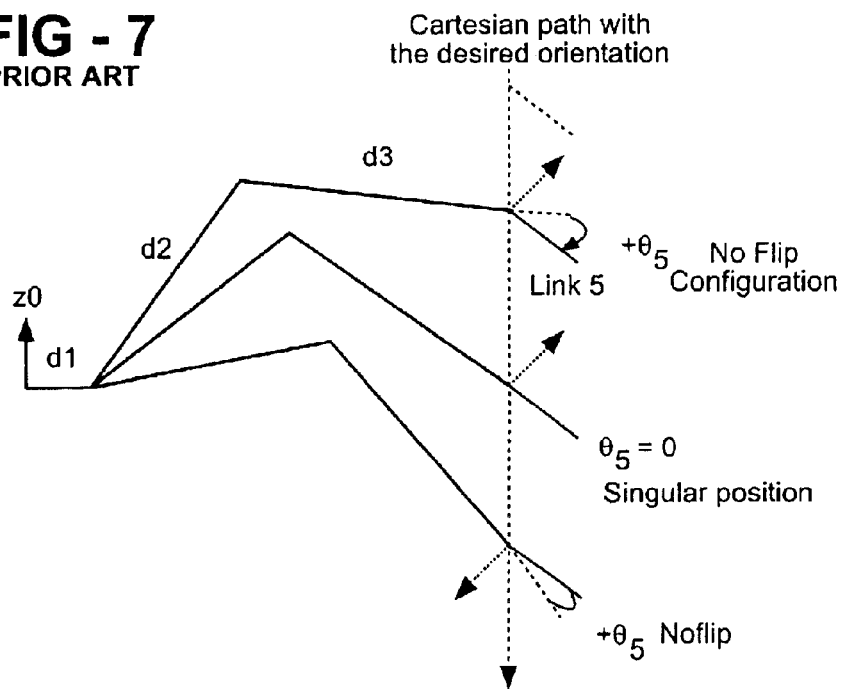
FIG. 7 is a prior art graphical representation of the robot of FIG. 3 rotating 180 degrees about a fourth axis and a sixth axis to maintain configuration in response to encountering the wrist singularity.
Figure 6:
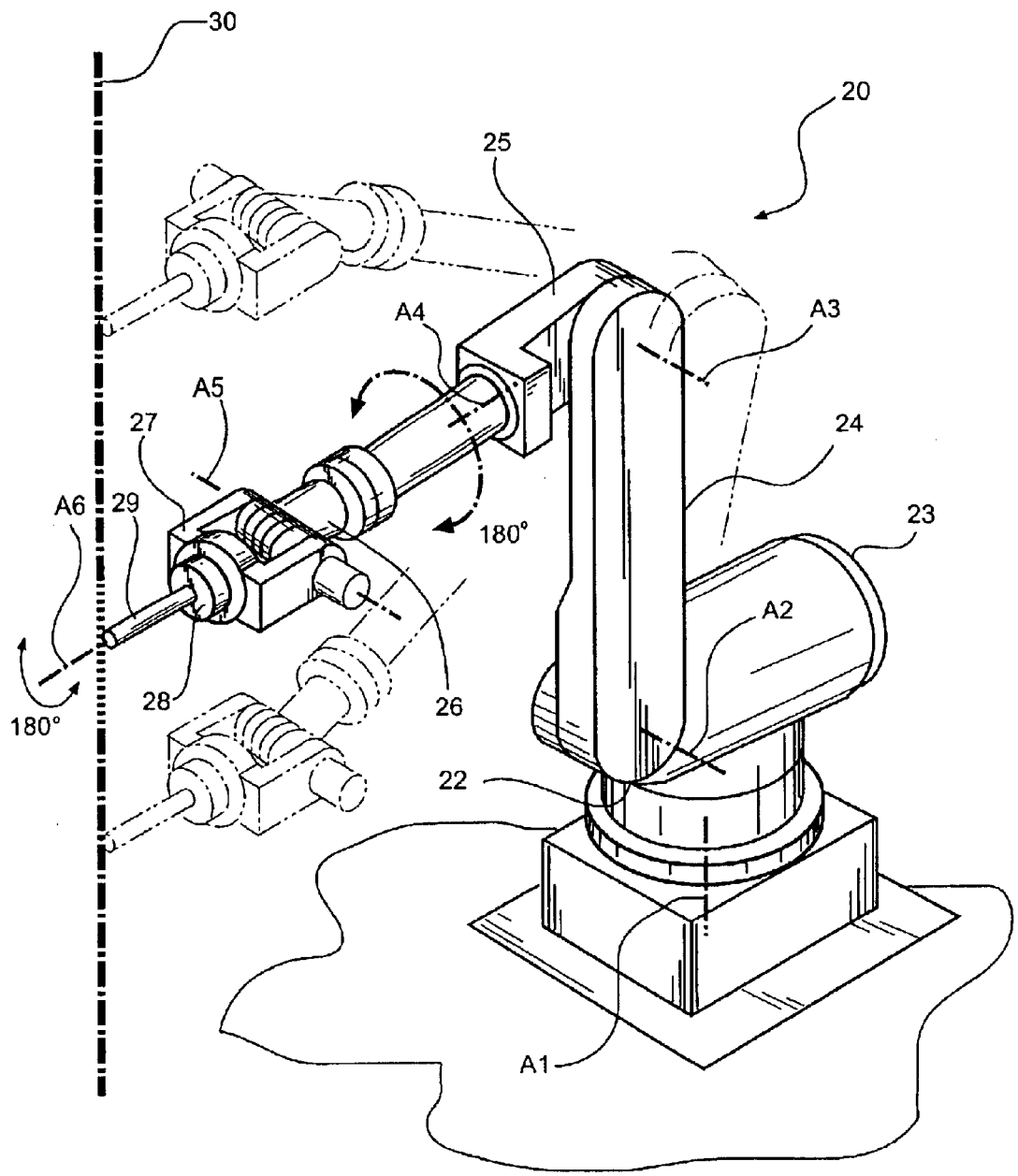
FIG. 6 is a prior art perspective view of the six axis robot of FIG. 3 encountering a wrist singularity.
Figure 8:
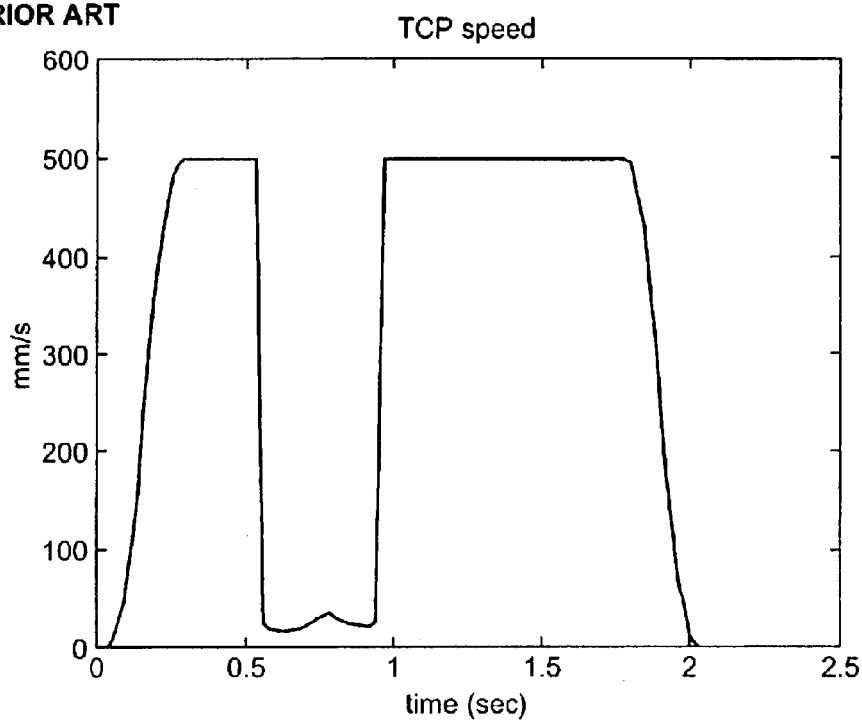
FIG. 8 is a prior art graphical representation of the robot of FIG. 3 slowing the TCP speed as the robot rotates about the fourth axis and the sixth axis.

To further illustrate the subject invention, a three axes robot will be used in this section. For the robot 20 in FIG. 2A having the first axis A1, the second axis A2 and the third axis A3, respectively defining the first angle, the second angle and the third angle, an example according to the method is described below. Since the robot has only three degrees of freedom, the position of the tool attached to the robot can be characterized as x, y and r—three components in Cartesian space with an appropriate world coordinate frame. The x- and y-components define the location of the tool while r-component denotes the orientation of the tool. This robot has only one configuration set which is the right configuration and the left configuration. Again the initial configuration is immaterial, and for this example, the right configuration is the initial configuration. The inline singularity occurs at the boundary of this right and left configuration set, when the first and second joint axes are inline, either fully stretched out or folded in. The more interesting case, which is described here, is when they are folded in. At point 50, the step of selecting the other configuration in the set is then defined as selecting the left configuration. In the region 52, the step of selecting one the axes is further defined as selecting the first axis A1. Normal inverse kinematics is used to solve for joint 1 with right configuration at point 48 and with left configuration at point 50. The step of interpolating the angle of the selected axis is further defined as interpolating the first angle from its starting value at point 48 to its ending value at point 50. The step of minimizing the Cartesian location error while matching the Cartesian orientation within the region 52 with the first angle known is illustrated as follows.

With reference to FIG. 13, as the robot 32 moves along the path 33, the inline singularity is detected by checking how close the angle between the first axis A1 and the second axis A2 is to 180 degrees. In region 52, based on the interpolated joint 1 value and the desired Cartesian location, we solved for joint 2 to position the WCP such that the location error is minimized. This can be achieved as follows: Still referring to FIG. 13, given the joint angle of the first axis A1, the possible location of WCP forms a circle centered at the second axis A2 with the radius of the length of link 2. By projecting the desired location onto this circle, we can then solve for joint 2 with a small location error. Consequently, the WCP trace will pass through exact inline singularity following this procedure and the maximum location error is the distance $d_{wcp}$ as shown in FIG. 13. Subsequently, the third joint angle can be solved to maintain the exact Cartesian orientation. The end result is that, the subject invention allows the TCP speed to be maintained in region 52 without high joint axis A1 speed while encountering inline singularity.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A method of controlling a robot (32) having a plurality of arms rotatable about a plurality of axes defining a plurality of angles therebetween and supporting a tool (49) having a tool point (TCP) for relative movement of the tool (49) along a path (33) having a starting point (44) and an ending point (46) defined in Cartesian coordinates, wherein the robot (32) has at least one of a first configuration set having an up configuration and a down configuration, a second configuration set having a flip configuration and a no-flip configuration, and a third configuration set having a front configuration and a back configuration, and wherein the robot (32) approaches a singularity associated with the configuration set along the path (33) while moving about the plurality of axes, said method comprising the steps of:

selecting the up configuration, the no-flip configuration, and the front configuration from the first, second, and third sets to position the TCP at the starting point (44) with the angles of the arms in an initial configuration;

selecting the up configuration, the flip configuration, and the front configuration from the sets to position the TCP at the ending point (46) with the angles of the arms in a final configuration;

rotating the arms about the axes by changing the angles therebetween to move the TCP from the starting point (44) along the path (33) while maintaining the initial configuration;

approaching the singularity which occurs between a first point (48) and a second point (50) along the path (33);

selecting one of the axes in the initial configuration in response to reaching the first point (48);

interpolating the angle for the selected axis from the first point (48) to the second point (50) in a predetermined number of steps (52) between the first point (48) and the second point (50);

determining the angles about the remaining axes in relationship to the aforesaid interpolation at each of the steps (52) to position the arms in the final configuration when the TCP reaches the second point (50) in response to determining the angles; and rotating the arms about the axes by changing the angles therebetween to move the TCP along the path (33) to the ending point (46) while maintaining the final configuration.

2. A method of controlling a robot (32) having a plurality of arms rotatable about a plurality of axes defining a plurality of angles therebetween and supporting a tool (49) having a tool point (TCP) for relative movement of the tool (49) along a path (33) having a starting point (44) and an ending point (46) defined in Cartesian coordinates, wherein the robot (32) has at least one of a first configuration set having an up configuration and a down configuration, a second configuration set having a flip configuration and a no-flip configuration, and a third configuration set having a front configuration and a back configuration, and wherein the robot (32) approaches a singularity associated with the configuration set along the path (33) while moving about the plurality of axes, said method comprising the steps of:

selecting the up configuration, the no-flip configuration, and the front configuration from the first, second, and third sets to position the TCP at the starting point (44) with the angles of the arms in an initial configuration;

selecting the up configuration, the no-flip configuration, and the back configuration from the sets to position the TCP at the ending point (46) with the angles of the arms in a final configuration;

rotating the arms about the axes by changing the angles therebetween to move the TCP from the starting point (44) along the path (33) while maintaining the initial configuration;

approaching the singularity which occurs between a first point (48) and a second point (50) along the path (33);

selecting one of the axes in the initial configuration in response to reaching the first point (48);

interpolating the angle for the selected axis from the first point (48) to the second point (50) in a predetermined number of steps (52) between the first point (48) and the second point (50);

determining the angles about the remaining axes in relationship to the aforesaid interpolation at each of the steps (52) to position the arms in the final configuration when the TCP reaches the second point (50) in response to determining the angles; and rotating the arms about the axes by changing the angles therebetween to move the TCP along the path (33) to the ending point (46) while maintaining the final configuration.

3. A method of controlling a robot (32) having a plurality of arms rotatable about a plurality of axes defining a plurality of angles therebetween and supporting a tool (49) having a tool point (TCP) for relative movement of the tool (49) along a path (33) having a starting point (44) and an ending point (46) defined in Cartesian coordinates, wherein the robot (32) has at least one of a first configuration set having an up configuration and a down configuration, a second configuration set having a flip configuration and a no-flip configuration, and a third configuration set having a front configuration and a back configuration, and wherein the robot (32) approaches a singularity associated with the configuration set along the path (33) while moving about the plurality of axes, said method comprising the steps of:

selecting the up configuration, the no-flip configuration, and the front configuration from the first, second, and third sets to position the TCP at the starting point (44) with the angles of the arms in an initial configuration;

selecting the down configuration, the no-flip configuration, and the front configuration from the sets to position the TCP at the ending point (46) with the angles of the arms in a final configuration;

rotating the arms about the axes by changing the angles therebetween to move the TCP from the starting point (44) along the path (33) while maintaining the initial configuration;

approaching the singularity which occurs between a first point (48) and a second point (50) along the path (33);

selecting one of the axes in the initial configuration in response to reaching the first point (48);

interpolating the angle for the selected axis from the first point (48) to the second point (50) in a predetermined number of steps (52) between the first point (48) and the second point (50);

determining the angles about the remaining axes in relationship to the aforesaid interpolation at each of the steps (52) to position the arms in the final configuration when the TCP reaches the second point (50) in response to determining the angles; and rotating the arms about the axes by changing the angles therebetween to move the TCP along the path (33) to the ending point (46) while maintaining the final configuration.

4. A method of controlling a robot (32) having a plurality of arms rotatable about a plurality of axes defining a plurality of angles therebetween and supporting a tool (49) having a tool point (TCP) for relative movement of the tool (49) along a path (33) having a starting point (44) and an ending point (46) defined in Cartesian coordinates, wherein the robot (32) has at least one of a first configuration set having an up configuration and a down configuration, a second configuration set having a flip configuration and a no-flip configuration, and a third configuration set having a front configuration and a back configuration, and wherein the robot (32) approaches a singularity associated with the configuration set along the path (33) while moving about the plurality of axes, said method comprising the steps of:

selecting the configuration of at least one of the first, second, and third sets to position the TCP at the starting point (44) with the angles of the arms in an initial configuration;

selecting the other configuration of at least one of the sets to position the TCP at the ending point (46) with the angles of the arms in a final configuration;

rotating the arms about the axes by changing the angles therebetween to move the TCP from the starting point

(44) along the path (33) while maintaining the initial configuration;

approaching the singularity which occurs between a first point (48) and a second point (50) along the path (33);

selecting one of the axes in the initial configuration in response to reaching the first point (48);

interpolating the angle for the selected axis from the first point (48) to the second point (50) in a predetermined number of steps (52) between the first point (48) and the second point (50);

determining the angles about the remaining axes in relationship to the aforesaid interpolation at each of the steps (52) to position the arms in the final configuration when the TCP reaches the second point (50) in response to determining the angles; and rotating the arms about the axes by changing the angles therebetween to move the TCP along the path (33) to the ending point (46) while maintaining the final configuration.

5. A method as set forth in claim 4 wherein each of the points along the path (33) are further defined by a desired location component and a desired orientation component and wherein the step of determining the angles about the remaining axes further includes determining an actual location component and an actual orientation component.

6. A method as set forth in claim 5 further including the step of minimizing a difference between at least one of the actual location component and the desired location component and the actual orientation component and the desired orientation component.

7. A method as set forth in claim 6 wherein the step of minimizing the difference between the location and orientation components is further defined as equating the actual location component to the desired location component and minimizing the difference between the actual orientation component and the desired orientation component.

8. A method as set forth in claim 7 wherein the step of minimizing the difference between the orientation components is further defined as selecting an orientation equation that is a function of at least two of the angles and manipulating the two angles to solve the orientation equation for a minimum value.

9. A method as set forth in claim 8 wherein the step of equating the actual location component to the desired location component is further defined as manipulating the angles about the remaining axes to equate the actual location component to the desired location component.

10. A method as set forth in claim 9 wherein the plurality of axes is further defined as a first axis A1, a second axis A2, a third axis A3, a fourth axis A4, a fifth axis A5, and a sixth axis A6 respectively defining a first angle, a second angle, a third angle, a fourth angle, a fifth angle, and a sixth angle, and wherein the step of selecting one of the axes is further defined as selecting the fourth axis A4, and wherein the step of interpolating the angle for the selected axis is further defined as interpolating the fourth angle, and wherein the step of manipulating the two angles is further defined as manipulating the fifth and the sixth angles to solve the orientation equation for the minimum value.

11. A method as set forth in claim 10 wherein the step of manipulating the angles about the remaining axes is further defined as manipulating the first angle, the second angle, and the third angle to equate the actual location component to the desired location component.

12. A method as set forth in claim 9 further including the step of iteratively solving the orientation equation to minimize the difference between the actual orientation component and the desired orientation component.

13. A method as set forth in claim 10 wherein the step of iteratively solving the orientation equation is further defined as determining the derivative of the orientation equation with respect to each of the at least two angles, applying a Newton-Raphson method to the determined derivative, and selecting the angles that result in the derivative equaling zero.

14. A method as set forth in claim 6 wherein the step of minimizing the difference between the location and orientation components is further defined as equating the actual orientation component to the desired orientation component and minimizing the difference between the actual location component and the desired location component.

15. A method as set forth in claim 14 wherein the step of minimizing the difference between the location components is further defined as selecting a location equation that is a function of at least two of the angles and manipulating the at least two angles to solve the location equation for a minimum value.

16. A method as set forth in claim 15 wherein the step of equating the actual orientation component to the desired orientation component is further defined as manipulating the angles about the remaining axes to equate the actual orientation component to the desired orientation component.

17. A method as set forth in claim 16 wherein the plurality of axes is further defined as a first axis A1, a second axis A2, a third axis A3, a fourth axis A4, a fifth axis A5, and a sixth axis A6 respectively defining a first angle, a second angle, a third angle, a fourth angle, a fifth angle, and a sixth angle, and wherein the step of selecting one of the axes is further defined as selecting the first axis A1, and wherein the step of interpolating the angle for the selected axis is further defined as interpolating the first angle, and wherein the step of manipulating the two angles is further defined as manipulating the second and the third angles to solve the location equation for the minimum value.

18. A method as set forth in claim 17 wherein the step of manipulating the angles about the remaining axes is further defined as manipulating the fourth angle, the fifth angle, and the sixth angle to equate the actual orientation component to the desired orientation component.

19. A method as set forth in claim 16 further including the step of solving the location equation to minimize the difference between the actual location component and the desired location component.

20. A method as set forth in claim 16 wherein the plurality of axes is further defined as a first axis A1, a second axis A2, a third axis A3, a fourth axis A4, a fifth axis A5, and a sixth axis A6 respectively defining a first angle, a second angle, a third angle, a fourth angle, a fifth angle, and a sixth angle, and wherein the step of selecting one of the axes is further defined as selecting the second axis A2, and wherein the step of interpolating the angle for the selected axis is further defined as interpolating the second angle, and wherein the step of manipulating the two angles is further defined as manipulating the first and the third angles to solve the location equation for the minimum value.

21. A method as set forth in claim 4 wherein the step of selecting the configuration of at least one of the sets is further defined as selecting the configuration from each of the sets to define the initial configuration and wherein the step of selecting the other configuration of the at least one of the sets is further defined as selecting at least one other configuration of the sets to define the final configuration.

22. A method as set forth in claim 21 wherein the step of selecting the configuration from each of the sets is further defined as selecting the up configuration, the no-flip configuration, and the front configuration to define the initial configuration and wherein selecting at least one other configuration of the sets is further defined as selecting the up configuration, the flip configuration, and the front configuration to define the final configuration.

23. A method as set forth in claim 21 wherein the step of selecting the configuration from each of the sets is further defined as selecting the up configuration, the no-flip configuration, and the front configuration to define the initial configuration and wherein the step of selecting at least one other configuration of the sets is further defined as selecting the up configuration, the no-flip configuration, and the back configuration to define the final configuration.

24. A method as set forth in claim 21 wherein the step of selecting the configuration from each of the sets is further defined as selecting the up configuration, the no-flip configuration, and the front configuration to define the initial configuration and wherein the step of selecting at least one other configuration of the sets is further defined as selecting the down configuration, the no-flip configuration, and the front configuration to define the final configuration.

25. A method of controlling a robot (32) having a plurality of arms rotatable about a plurality of axes defining a plurality of angles therebetween and supporting a tool (49) having a tool point (TCP) for relative movement of the tool (49) along a path (33) having a starting point (44) and an ending point (46) defined in Cartesian coordinates, wherein the robot (32) has at least one of a first configuration set having an up configuration and a down configuration, a second configuration set having a flip configuration and a no-flip configuration, and a third configuration set having a front configuration and a back configuration, and wherein the robot (32) approaches a singularity associated with the configuration set along the path (33) while moving about the plurality of axes, said method comprising the steps of:

selecting the configuration of at least one of the first, second, and third sets to position the TCP at the starting point (44) with the angles of the arms in an initial configuration;

selecting the other configuration of at least one of the sets to position the TCP at the ending point (46) with the angles of the arms in a final configuration;

rotating the arms about the axes by changing the angles therebetween to move the TCP from the starting point (44) along the path (33) while maintaining the initial configuration;

approaching the singularity which occurs between a first point (48) and a second point (50) along the path (33);

determining the angles about the axes to move the TCP between the first point (48) and the second point (50) and through the singularity; and rotating the arms about the axes by changing the angles therebetween to move the TCP along the path (33) while maintaining the final configuration to the ending point (46).

26. A method as set forth in claim 25 wherein each of the points along the path (33) are further defined by a desired location component and a desired orientation component and wherein the step of determining the angles about the axes further includes determining an actual location component and an actual orientation component.

27. A method as set forth in claim 26 further including the step of minimizing a difference between at least one of the actual location component and the desired location component and the actual orientation component and the desired orientation component.

28. A method as set forth in claim 27 wherein the step of minimizing the difference between the location and orientation components is further defined as equating the actual location component to the desired location component and minimizing the difference between the actual orientation component and the desired orientation component.

29. A method as set forth in claim 26 wherein the step of minimizing the difference between the orientation components is further defined as selecting an orientation equation that is a function of at least two of the angles and manipulating the at least two angles to solve the orientation equation for a minimum value.

30. A method as set forth in claim 29 wherein the step of equating the actual location component to the desired location component is further defined as manipulating the angles about the axes to equate the actual location component to the desired location component.

31. A method as set forth in claim 30 further including the step of iteratively solving the orientation equation to minimize the difference between the actual orientation component and the desired orientation component.

32. A method as set forth in claim 31 wherein the step of iteratively solving the orientation equation is further defined as determining the derivative of the orientation equation with respect to each of the at least two angles, applying a Newton-Raphson method to the determined derivative, and selecting the angles that result in the derivative equaling zero.

33. A method as set forth in claim 29 wherein the step of minimizing the difference between the location and orientation components is further defined as equating the actual orientation component to the desired orientation component and minimizing the difference between the actual location component and the desired location component.

34. A method as set forth in claim 33 wherein the step of minimizing the difference between the location components is further defined as selecting a location equation that is a function of at least two of the angles and manipulating the at least two angles to solve the location equation for a minimum value.

35. A method as set forth in claim 34 wherein the step of equating the actual orientation component to the desired orientation component is further defined as manipulating the angles about the axes to equate the actual orientation component to the desired orientation component.

36. A method as set forth in claim 35 further including the step of solving the location equation to minimize the difference between the actual location component and the desired location component.

* * * * *